(12) United States Patent
Charan et al.

(10) Patent No.: US 9,191,377 B2
(45) Date of Patent: Nov. 17, 2015

(54) METHOD FOR NETWORK COMMUNICATION PAST ENCRYPTION DEVICES

(71) Applicant: Architecture Technology Corporation, Minneapolis, MN (US)

(72) Inventors: Deborah K. Charan, Minneapolis, MN (US); Taylor Bouvin, Bloomington, MN (US); Ranga Ramanujan, Medina, MN (US); Barry A. Trent, Chanhassen, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/165,192

(22) Filed: Jan. 27, 2014

(65) Prior Publication Data
US 2015/0149764 A1    May 28, 2015

Related U.S. Application Data

(60) Provisional application No. 61/909,839, filed on Nov. 27, 2013.

(51) Int. Cl.
*H04L 29/06*    (2006.01)
(52) U.S. Cl.
CPC ........ *H04L 63/0471* (2013.01); *H04L 63/0428* (2013.01); *H04L 63/164* (2013.01); *H04L 63/166* (2013.01); *H04L 63/18* (2013.01)
(58) Field of Classification Search
None
See application file for complete search history.

(56) References Cited

U.S. PATENT DOCUMENTS

| 6,975,647 | B2* | 12/2005 | Neale et al. | 370/466 |
|---|---|---|---|---|
| 7,360,083 | B1* | 4/2008 | Ragireddy et al. | 713/160 |
| 7,441,267 | B1* | 10/2008 | Elliott | 726/13 |
| 7,684,414 | B2* | 3/2010 | Durst | 370/400 |
| 7,964,624 | B1* | 6/2011 | Cottrell et al. | 514/378 |
| 8,311,049 | B2* | 11/2012 | Roberts et al. | 370/412 |
| 8,549,135 | B1* | 10/2013 | Yazdani | 709/224 |
| 2003/0131079 | A1* | 7/2003 | Neale et al. | 709/220 |
| 2009/0238367 | A1* | 9/2009 | Pinder | 380/279 |
| 2013/0318238 | A1* | 11/2013 | Hall et al. | 709/224 |

OTHER PUBLICATIONS

Burdin et al., "Techniques for Enabling Dynamic Routing on Airborne Platforms," 2009 IEEE Military Communications Conference, The MITRE Corporation, Case # 09-3230, Oct. 18-21, 2009, 9 pp.
Danilov et al., "MANET Multicast with Multiple Gateways," 2008 IEEE Military Communications Conference, Nov. 16-19, 2008, 8 pp.

(Continued)

*Primary Examiner* — Gilberto Barron, Jr.
*Assistant Examiner* — Wayne An
(74) *Attorney, Agent, or Firm* — Shumaker & Sieffert, P.A.

(57) ABSTRACT

This disclosure is directed to techniques for providing communication between devices in different networks wherein the communication must first pass through an encryption mechanism and the devices do not have the stand-alone capability to encrypt or decrypt the communication. According to these techniques, an adapter may determine certain fields in a data packet that remain unencrypted when the data packet passes through the encryption mechanism. The adapter may then process those fields in such a way that, when the data packets are received by a second adapter, the second adapter may read those fields and obtain information.

32 Claims, 21 Drawing Sheets

(56) References Cited

OTHER PUBLICATIONS

Elmasry et al., "Reservation-Based QoS in an Airborne Network," 2009 IEEE Military Communications Conference, Oct. 18-21, 2009, 7 pp.

Estrin et al., Protocol Independent Multicast-Sparse Mode (PIM-SM): Protocol Specification, RFC 2362—The Internet Society, Jun. 1998, 55 pp.

Garcia-Luna-Aceves et al., "The Core-Assisted Mesh Protocol," IEEE Journal on Selected Areas in Communications, vol. 17, No. 8, Aug. 1999, 15 pp.

Jetcheva et al., "Adaptive Demand-Driven Multicast Routing in Multi-Hop Wireless Ad Hoc Networks," MobiHoc '01 Proceedings of the 2nd ACM international symposium on Mobile ad hoc networking & computing, Oct. 4-5, 2001, 12 pp.

Lee et al., "On-Demand Multicast Routing Protocol in Multihop Wireless Mobile Networks," Mobile Networks and Applications, vol. 7, No. 6, Dec. 2002, 16 pp.

Macker et al., "Simplified Multicast Forwarding in Mobile Ad hoc Networks," 2004 IEEE Military Communications Conference, vol. 2, Oct. 31-Nov. 4, 2004, 8 pp.

Moy, "Multicast Extensions to OSPF," RFC 1584, Mar. 1994, 101 pp.

Nakamoto et al., "High Assurance Internet Protocol Encryptor Multicast Discovery Service," MITRE Technical Report MTR110417, Sep. 2011, 7 pp.

Nakamoto et al., "Scalable HAIPE Discovery using DNS-like Referral Model," 2005 IEEE Military Communications Conference, vol. 4, Oct. 17-20, 2005, 14 pp.

Rangarajan et al.," Performance Analysis of Multicast Protocols: ODMRP, PUMA and OBAMP," International Journal of Computer Science and Communication, vol. 2, No. 2, Jul.-Dec. 2011, 5 pp.

Royer et al., "Multicast operation of the ad-hoc on-demand distance vector routing protocol," MobiCom '99 Proceedings of the 5th annual ACM/ICEEE international conference on Mobile computing and networking, Aug. 15-19, 1999, 12 pp.

Vaishampayan et al, "Efficient and Robust Multicast Routing in Mobile Ad Hoc Networks," Proceedings of the 1st IEEE International Conference on Mobile Ad-hoc and Sensor Systems, Oct. 24-27, 2004, 11 pp.

Wang et al, "An Intelligent On-Demand Multicast Routing Protocol in Ad Hoc Networks," 15th International Conference on Information Networking, Jan. 31-Feb. 2, 2001, 6 pp.

Wu et al., "AMRIS: A Multicast Protocol for Ad Hoc Wireless Networks," Proceedings of the IEEE Military Communications Conference, vol. 1, Oct. 31-Nov. 3, 1999, 5 pp.

Xie et al., "AMRoute: Ad Hoc Multicast Routing Protocol," Mobile Networks and Applications, vol. 7, No. 6, Dec. 2002, 11 pp.

U.S. Appl. No. 61/909,854 by John Wu, filed Nov. 27, 2013.

\* cited by examiner

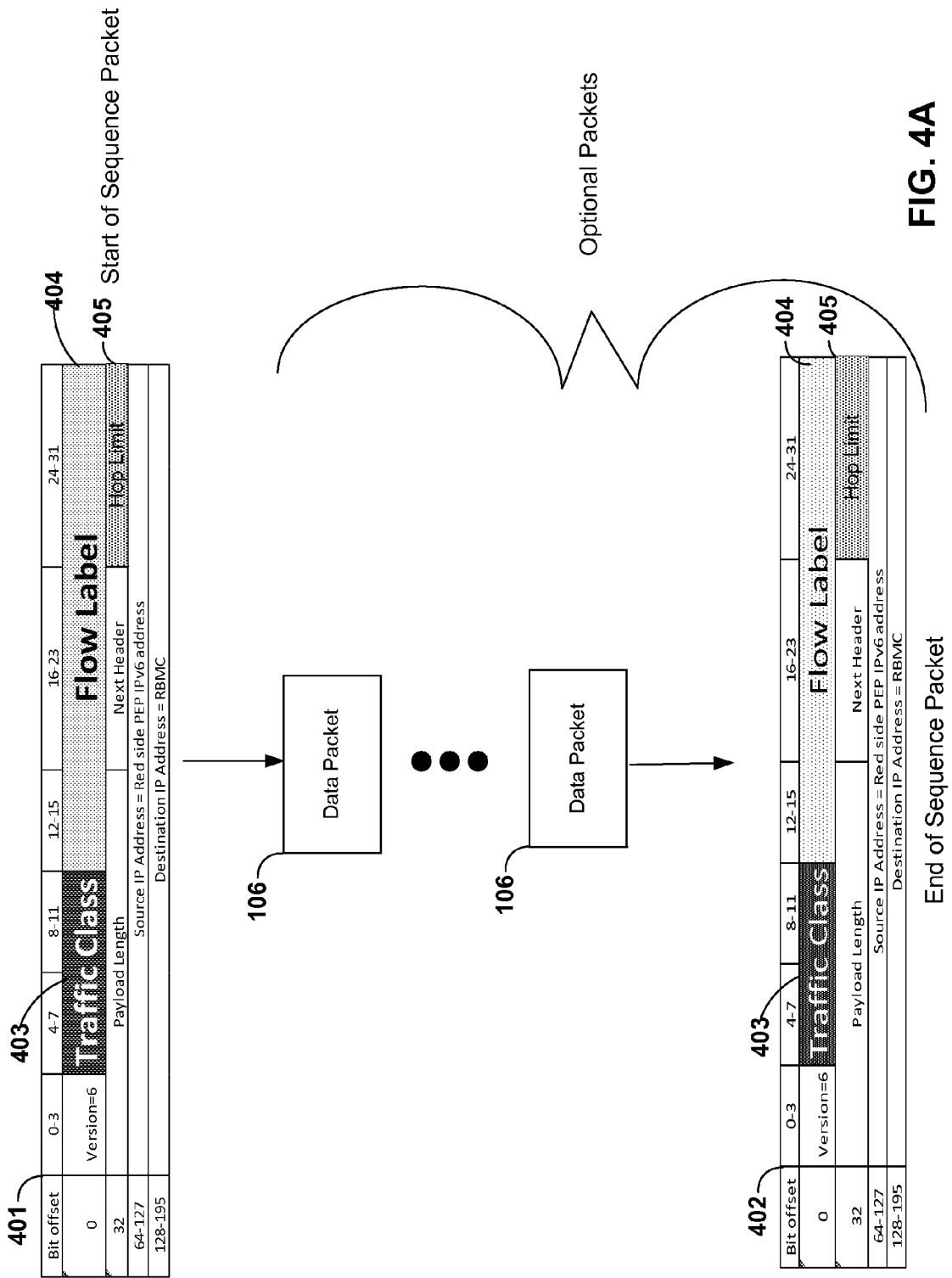

METHOD FOR NETWORK COMMUNICATION PAST ENCRYPTION DEVICES

This application claims priority from U.S. Provisional Application Ser. No. 61/909,839, filed Nov. 27, 2013, the entire content of which is incorporated herein by reference.

STATEMENT REGARDING FEDERALLY SPONSORED RESEARCH OR DEVELOPMENT

This invention was made with Government support under Contract FA8750-13-C-0047 with the United States Department of Defense. The Government may have certain rights in this invention.

TECHNICAL FIELD

The disclosure relates to communication between devices in different networks.

BACKGROUND

One technique for transferring data from one trusted (Red) Internet Protocol (IP) network enclave to another trusted network enclave is to use an IP packet encryption device to encrypt the data leaving an enclave, send the data in packets through an untrusted (Black) network interconnecting the enclaves, receive the data on a decryption device at the target Red IP network enclave, and decrypt those packets before reassembling the data packets into the original message. This is helpful in the event that the data packets carry sensitive or classified content in some way, as the encrypted content would be inaccessible and unreadable to an outsider in the Black network who may eavesdrop on the communication.

SUMMARY

In general, the disclosure is directed to communicating between devices in different IP network enclaves when all transmissions must pass through a packet encryption device before they leave an enclave and the communication devices do not have the standalone capability to encrypt or decrypt the message. For example, according to the techniques of this disclosure, a Crypto-Partitioning Aware Protocol adapter for Tactical Networks (CAPTAIN) allows this communication to occur. CAPTAIN may do this by intercepting data packets, determining what fields in an IP data packet will remain unencrypted when passed through an IP packet encryption device and then populating those fields in such a way that a coherent message may be read by a second communication adapter implementing CAPTAIN, where the second communication device is connected to the output of the IP packet encryption device.

In one embodiment, the disclosure is directed to a method in which devices communicate amongst themselves in a network. A first protocol adapter may process a data packet including one or more pass-through fields, wherein the one or more pass-through fields are located in a portion of the data packet that remains unencrypted when the data packet is processed by an encryption device. The first protocol adapter may send the data packet to the encryption device. A second protocol adapter may receive the data packet from the encryption device. The second protocol adapter may then read the one or more pass-through fields.

In another embodiment, the disclosure is directed to a communication apparatus that works within a network or set of networks. The communication apparatus may comprise a first protocol adapter, wherein the first protocol adapter may process a data packet including one or more pass-through fields, wherein the one or more pass-through fields are located in a portion of the data packet that remains unencrypted when the data packet is processed by an encryption device, and wherein the first protocol adapter may send the data packet to the encryption device. The communication apparatus may also comprise a second protocol adapter, wherein the second protocol adapter may receive the data packet from the encryption device and read the one or more pass-through fields.

In another embodiment, the disclosure is directed to a computer-readable medium containing instructions. The instructions may cause a programmable processor to process, with a first protocol adapter, a data packet including one or more pass-through fields, wherein the one or more pass-through fields are located in a portion of the data packet that remains unencrypted when the data packet is processed by an encryption device. The instructions may then cause the programmable processor to send, with the first protocol adapter, the data packet to the encryption device. The instructions may then cause the programmable processor to receive the data packet from the encryption device at a second protocol adapter. The instructions may then cause the programmable processor to read the one or more pass-through fields at the second protocol adapter.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A-4C are conceptual diagrams showing the bit address of different fields in a Start of Sequence/End of Sequence and data packets sent over the INE devices.

DETAILED DESCRIPTION

Figure 1:
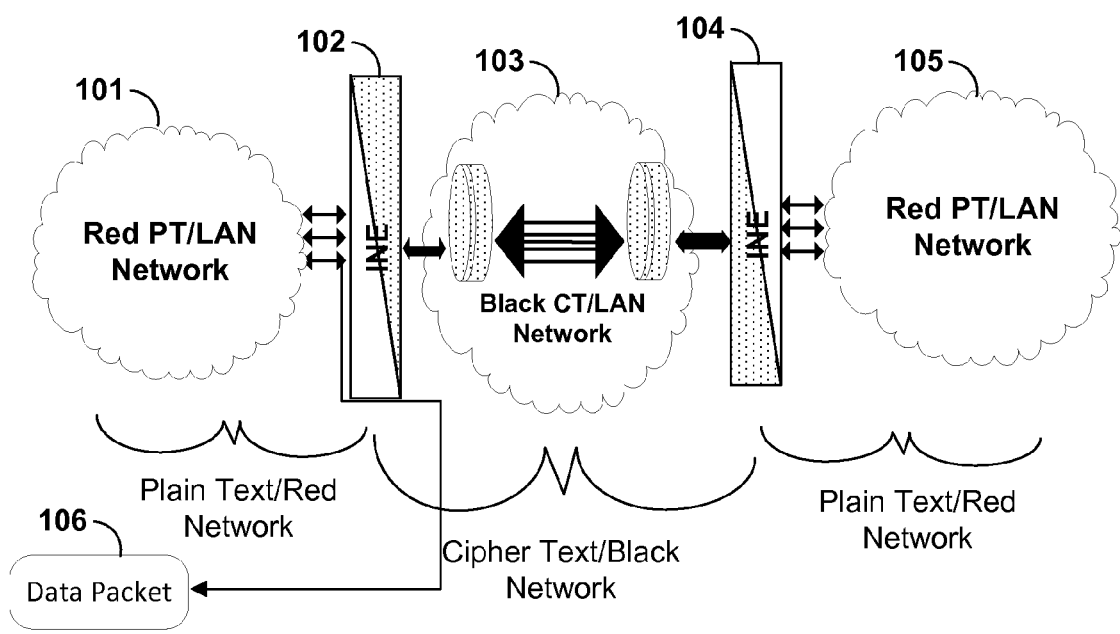
FIG. 1 is a system diagram illustrating an In-Line Network Encryptor (INE) based network.

Many entities, including the United State Air Force and other military services, are upgrading their tactical networks to an Internet Protocol-based (IP-based) tactical network based on the use of end-to-end Internet Protocol Security-based (IPSEC-based) encryption of network traffic using In-Line Network Encryptor (INE) devices. An INE is typically a secure gateway that allows two separate trusted, internal networks (or red networks) to exchange data over an untrusted or lower-classification network (or black network). An INE accepts a data packet, typically in either IPv4 or IPv6 form. Each of these forms has certain fields defined by a particular bit offset amount. Most of these fields are encrypted by the INE device, but three of these fields will stay unencrypted. The fields that stay unencrypted are moved to an outer wrapper, or a header, of the new encrypted data packet, allowing those pass-through fields to be easily read at other protocol adapters. The fields that are encrypted are encrypted using a preplaced or dynamically-generated key, allowing the two separate trusted, internal networks (or red enclaves) to efficiently send and receive encrypted data, as each red network has access to the preplaced or dynamically-generated key.

End-to-end IPSEC-based INEs, such as a High Assurance Internet Protocol Encryptor (HAIPE®), benefit from requiring only one INE per trusted network. Further, INE devices offer a remote keying and rekeying process that is less cumbersome than traditional link layer encryption devices. Finally, traditional link layer encryption devices force a stove pipe configuration of the wide-area network where network links cannot be shared between traffic belonging to different classification levels as is possible with IPSEC-based INE devices. The use of INE devices typically saves costs compared to traditional link layer encryption for implementing needed Communications Security (COMSEC) capabilities due to the need for fewer encryption devices. INEs typically also have lower operation costs than link layer encryption. Link layer encryption does not allow network links to be shared between traffic belonging to different classification levels, as is possible with INE-based COMSEC. For organizations where COMSEC is crucial, such as the Department of Defense, the Department of Homeland Security, and law enforcement agencies, the use of IPSEC-based INEs yields significant cost savings.

While IPSEC-based INEs are cost-effective, the INE in its current form has drawbacks that limit the widespread use of this technology in tactical networks, especially those used by entities such as the Department of Homeland Security and the United States Military. INEs in their current state impair, and can even completely preclude, the operation of networking protocols and network optimization/acceleration techniques that are critical to the functioning of mission applications. Transmission Control Protocol Performance Enhancing Proxy (TCP PEP) operations are impaired by INEs in networks with dynamically varying link characteristics and networks with multiple Cypher Text-side (CT-side) asymmetric links with load balancing. A CT-side means that the link is located in the untrusted Black networks and only sees data packets that have been encrypted. Asymmetric links are links that have different speeds for uploading data packets than they have for downloading data packets. Multicast operations such as Source Selective Multicast (SSM) and Protocol Independent Multicast-Source Specific Multicast (PIM-SSM) sessions are precluded by INEs. Disruption tolerant networking (DTN) operations, which are used in networks with episodic connectivity between endpoints, cannot operate through INEs. Certain signaling protocols may be precluded by INEs. Cyber security is also rendered less effective by INEs, as the current mitigation techniques of deep packet inspection are not available in an INE-based end-to-end encryption. While these drawbacks are seen prominently in INE devices, these same disadvantages can be seen across other encryption devices and methods.

In view of these drawbacks, this disclosure proposes techniques for enabling unimpeded operation of existing protocols and services functions across INEs. In one example of the disclosure, Crypto-Partitioning Aware Protocol adapters for Tactical Networks (CAPTAIN) are proposed. The CAPTAIN techniques allow devices to communicate across INEs, thus allowing for the implementation of protocol adapters.

Certain IPSEC-based INEs isolate fields in a data packet that the INE will leave unencrypted. The INE will take those fields and make them part of the header of an encrypted data packet. The CAPTAIN protocol of the disclosure utilizes the fields that will be isolated from encryption based on the type of data packet being sent and the INE being used. CAPTAIN uses a protocol adapter to intercept those packets and populate those isolated fields with bits that equate to a message readable by other protocol adapters in different networks. By making these fields readable in both plain-text and cypher-text networks, the techniques of this disclosure allows for the implementation of PEP functions across INEs (e.g., HAIPE® devices). In place of a protocol adapter, the techniques of this disclosure could also use software components, routers, Wide-Area Network (WAN) optimization appliances, or radios, among other things.

FIG. 1 is a system diagram illustrating an example communication path between two trusted, plain-text network enclaves (Red networks) through an untrusted, cypher-text network (Black network). A Red network deals with data packets that are not encrypted, i.e. plain-text data packets, usually because all devices in that network are trusted sources. These networks may comprise a single entity or these networks may comprise multiple trusted entities. These networks are commonly used in military and government communications, though they can also be found in corporate networks, virtual private networks (VPNs), or other home networks, among other networks. Conversely, Black networks may comprise any number of entities, including internet service providers, routers outside of the Red networks, or intermediary contacts, among other things. As such, users of Red networks may use encrypted text, or cypher texts to communicate over Black networks.

In the system shown in FIG. 1, when a first Red network 101 wants to communicate with a second Red network 105, the first Red network 101 creates IP data packet 106. The first Red network 101 sends data packet 106 to INE 102 for encryption. INE 102 may be a HAIPE® device or some other sort of IPSEC-based INE. The bits in data packet 106 are encrypted during this process, but some configurations of INE 102 may keep certain bits unencrypted in the header before sending the data packet into Black network 103. Data packet 106 arrives at INE 104 and is decrypted, finally arriving at second Red network 105 in its original form. INE 104 may be a HAIPE® device or some other sort of IP-based INE.

As mentioned above, some configurations of an INE, namely a HAIPE® encryption device in bypass mode, although other INEs could also be used, will leave some bits of IPv4 and IPv6 data packets unchanged. These unchanged bits are also called pass-through fields. The techniques of this disclosure (referred to here as CAPTAIN Signaling Protocol (CSP)) will make use of these bit fields to transfer data across the INE. In this disclosure, the one or more fields of a data packet that are bypassed by an INE will be generically referred to as "pass-through fields." If a CAPTAIN-enabled protocol adapter is placed on each side of each INE, the unchanged pass-through fields can be read across networks and unencrypted signaling messages between protocol adapters and networks can be sent. When one of these messages needs to be sent between protocol adapters, a start of signal (SOS) packet will be sent, followed by relevant data packets, and then an end of signal (EOS) packet. These unencrypted bits in the pass-through fields may be used to implement PEP functions, thus alleviating many of the issues keeping INEs from being a more commonly used INE in IP-based tactical networks.

For example, the unencrypted messages placed in the pass-through fields may allow protocol adapters to distinguish individual TCP flows and to perform per-flow load balancing by disaggregating individual TCP flows. These messages may also allow networks to determine if communications are being blocked by a denial of service attack by allowing protocol adapters to communicate with other protocol adapters to determine the number of packets seen on the Red-side of an INE and the amount of packets sent through the Black-side of an INE. DTN proxy functions will be able to designate the bundle boundaries of a DTN flow over an INE, ensuring that bundles are buffered and transferred appropriately until they eventually emerge again into a Red-side enclave. Protocol adapters already have built-in network sensing functionality, meaning that Black-side protocol adapters can report bandwidth and bit error rate information to the Red-side protocol adapters. QoS management also become viable, as protocol adapters can now communicate with one another in a way that allows the reservation of bandwidth to occur across Red and Black networks. In multicast systems, bandwidth is saved in Black networks by tagging individual flows, allowing the receiving side to subscribe to individual streams within the larger multicast tunnel including source-selective subscriptions. If there is congestion in a multicast system, CSP will tag data flows and assign flows to a-priori defined priorities, later using decision logic to add and drop flows on a dynamic basis. Other benefits from the use of CSP and the protocol adapters in an INE IP-based tactical network are certainly possible, as the above functionalities are only examples of what a CAPTAIN-enabled protocol adapter would add to an INE network. Specific examples of PEP functions that may be enabled by using the techniques of this disclosure will be discussed below with reference to the following figures.

Figure 2:
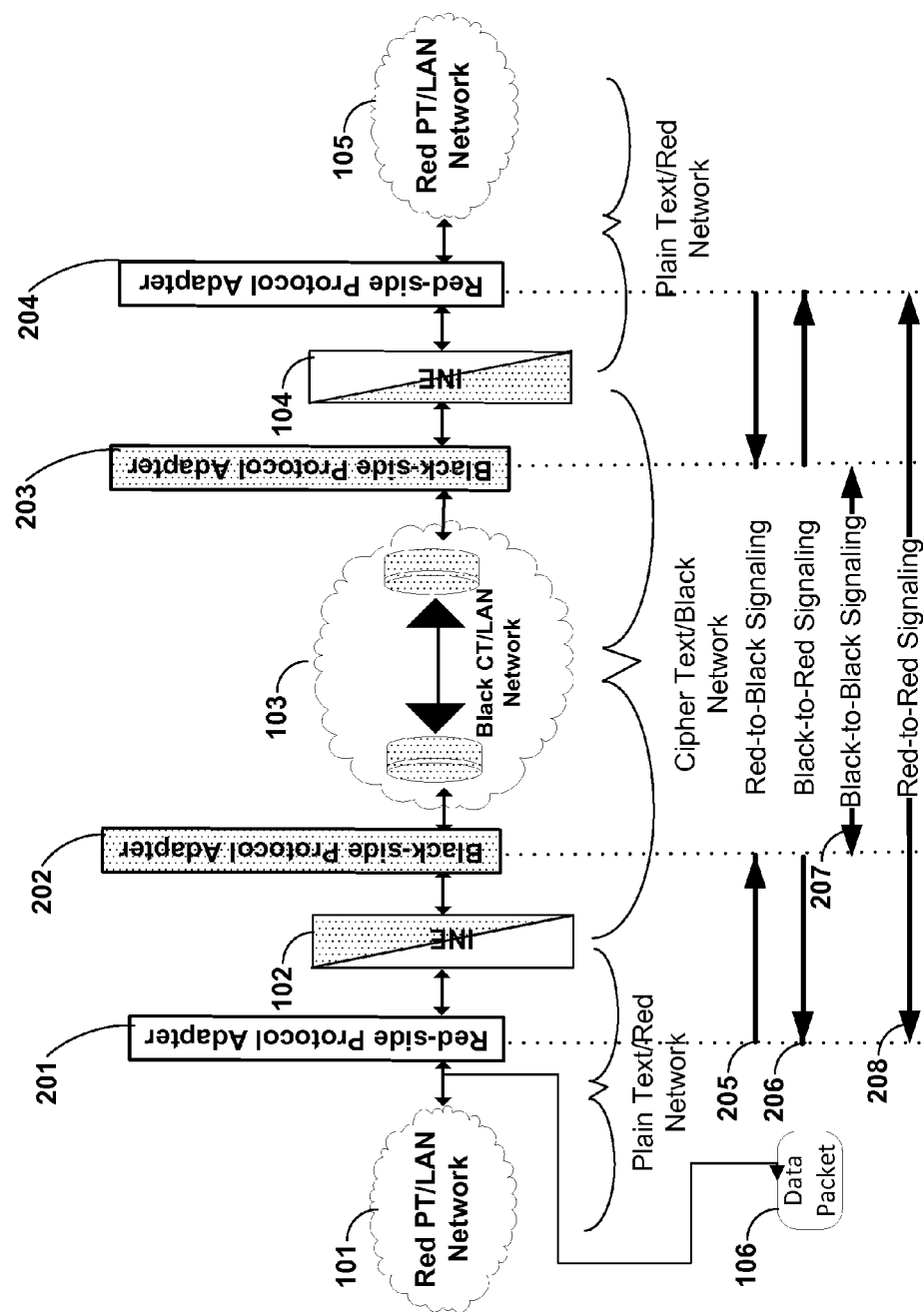
FIG. 2 is a system diagram illustrating an INE-based network with protocol adapters according to one example of the disclosure.

FIG. 2 is a system diagram illustrating an INE-based network with CAPTAIN-enabled protocol adapters combined with four possible signals that could be sent in the system. This system introduces two pairs of protocol adapters enabled with CAPTAIN, as well as shows the various signals that could be sent in this particular configuration. These protocol adapters could be performance-enhancing proxy (PEP) adapters, among other things.

In FIG. 2, a first Red network 101 creates data packet 106. Data packet 106 is then sent to a first Red-side protocol adapter 201 in first Red network 101. The first Red-side protocol adapter 201 processes data packet 106 in order to populate certain fields in data packet 106, or creates a signaling packet to send prior to the data packet, so that the first Red-side protocol adapter 201 can communicate with other protocol adapters in the system.

The data packet 106 is sent from first Red-side protocol adapter 201 to INE 102. INE 102 may be a HAIPE® device or some other sort of IPSEC-based INE. Most of the bits in data packet 106 are encrypted during this process, but some configurations of INE 102 may keep certain bits unencrypted within the header of the packet before the data packet 106 is received by a first Black-side protocol adapter 202 in the Black network 103. These unencrypted bits are pass-through fields.

The first Black-side protocol adapter 202 can read the signaling and/or data packet 106, functionally receiving a message from the first Red-side protocol adapter 201. The first Black-side protocol adapter 202 can either process data packet 106 in order to populate certain fields in data packet 106, or it can forward the data packet 106 into Black network 103. Black network 103 then forwards the data packet 106 to a second Black-side protocol adapter 203 located in the Black network 103. Processing data packet 106 comprises intercepting the data packet 106 and inserting information into the one or more pass-through fields.

The second Black-side protocol adapter 203 can read the one or more pass-through fields in the data packet 106, functionally receiving a message from the first Red-side protocol adapter 201 or the first Black-side protocol adapter 202. Reading the one or more pass-through fields comprises extracting the inserted information from the one or more pass-through fields. The second Black-side protocol adapter 203 can then either process data packet 106 in order to populate certain fields in data packet 106, or it can forward the data packet 106 to a second INE 104. The second INE 104 may be a HAIPE® device or some other sort of IP-based INE. The second INE 104 may then forward the data packet 106 to a second Red-side protocol adapter 204.

The second Red-side protocol adapter 204 can read the data packet 106, functionally receiving a message from the first Red-side protocol adapter 201 or the second Black-side protocol adapter 203. The second Red-side protocol adapter 204 can then either process data packet 106 in order to populate certain fields in data packet 106, or it can forward the data packet 106 to a second Red network 105, or it can send the packet back to first Red-Side protocol adapter 201.

Although this is one enumeration of how data packet 106 can travel along the system, it could also move entirely in reverse from Red network 105 to Red network 101, or it could travel back and forth between any of the protocol adapters, among other things. The first Red-side protocol adapter 201 can send data packets 106 to a first Black-side protocol adapter 202 using Red-to-Black Signaling 205 or to a second Red-side protocol adapter 204 using Red-to-Red signaling 208. The first Red-side protocol adapter 201 can receive data packets 106 from a first Black-side protocol adapter 202 using Black-to-Red Signaling 206 or from a second Red-side protocol adapter 204 using Red-to-Red signaling 208. The first Black-side protocol adapter 202 can send data packets 106 to a first Red-side protocol adapter 201 using Black-to-Red Signaling 206 or to a second Black-side protocol adapter 203 using Black-to-Black signaling 207. The first Black-side protocol adapter 202 can receive data packets 106 from a first Red-side protocol adapter 201 using Red-to-Black Signaling 205 or from a second Black-side protocol adapter 203 using Black-to-Black signaling 207. The second Black-side protocol adapter 203 can send data packets 106 to a second Red-side protocol adapter 204 using Black-to-Red Signaling 206 or to a first Black-side protocol adapter 202 using Black-to-Black signaling 207. The second Black-side protocol adapter 203 can receive data packets 106 from a second Red-side protocol adapter 204 using Red-to-Black Signaling 205 or from a first Black-side protocol adapter 202 using Black-to-Black signaling 207. The second Red-side protocol adapter 204 can send data packets 106 to a second Black-side protocol adapter 203 using Red-to-Black Signaling 205 or to a first Red-side protocol adapter 201 using Red-to-Red signaling 208. The second Red-side protocol adapter 204 can receive data packets 106 from a second Black-side protocol adapter 203 using Black-to-Red Signaling 206 or from a first Red-side protocol adapter 201 using Red-to-Red signaling 208.

Figure 3A:
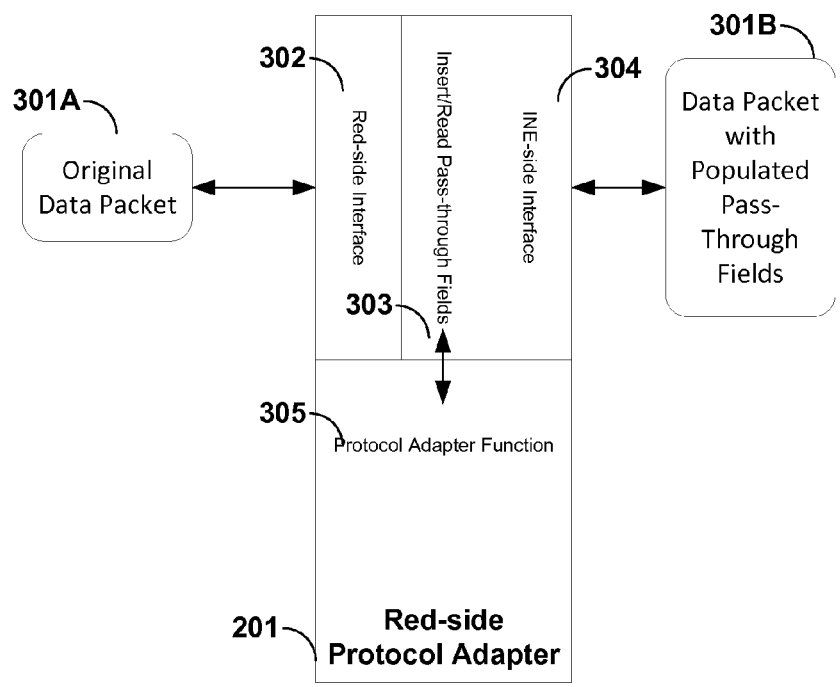
FIG. 3A is a block diagram showing a red-side protocol adapter in more detail.

FIG. 3A is a block diagram showing a CAPTAIN Red-side performance enhancing proxy (PEP or red-side protocol) adapter in greater detail. An original data packet 301A arrives at red-side protocol adapter 201 at Red-side interface 302. Red-side protocol adapter 201 can be software and/or instructions stored on a computer-readable storage medium that may be read and executed by one or more processors on an INE, hardware that can be coupled with an INE, or a standalone device that acts as an intermediary between a trusted network and an INE, among other things. Data packet 301A could be either an IPv4 data packet or an IPv6 data packet. Original data packet 301A is sent to interface 303, which either populates one or more pass-through fields in the original data packet 301A to form a data packet with populated pass-through fields 301B or reads the already populated pass-through fields of data packet 301B. These fields can be populated in various ways according to the techniques of this disclosure depending on which proxy function is being performed. This data packet with populated pass-through fields 301B is sent to INE-side interface 304 where it is further sent to an INE device for encryption. The data packet with populated pass-through fields 301B could also be sent to a protocol adapter port 305, where a proxy function is executed according to the techniques of this disclosure based on the contents of the pass-through fields. Data packets can also be sent from Red-side interface 302 to a trusted network.

Figure 3B:
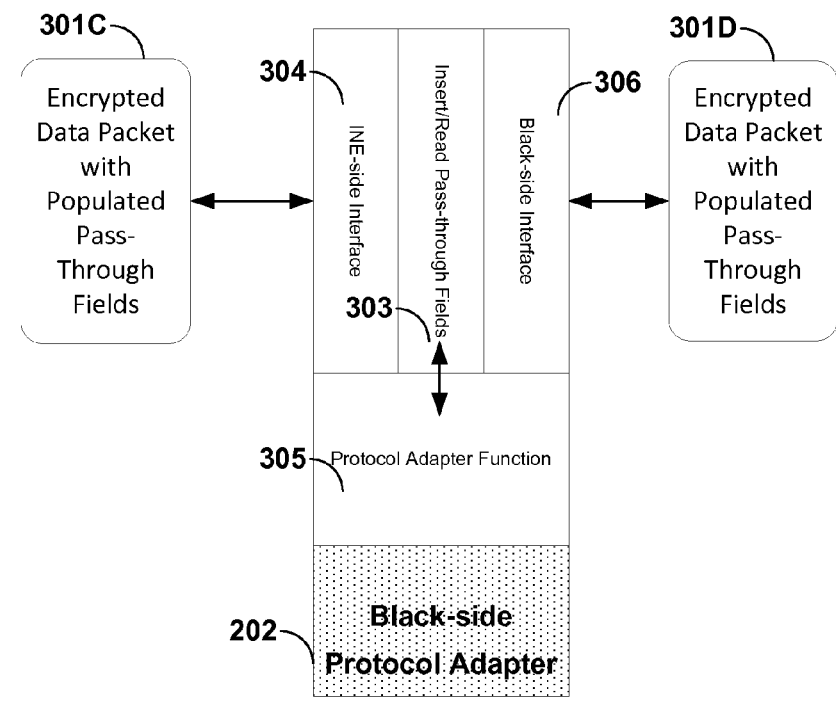
FIG. 3B is a block diagram showing a black-side protocol adapter in more detail.

FIG. 3B is a block diagram showing a CAPTAIN Black-side PEP (or black-side protocol) adapter in greater detail. Encrypted data packet with populated pass-through fields 301C is sent to black-side protocol adapter 202 where it is received by INE-side interface 304. Black-side protocol adapter 202 can be software and/or instructions stored on a computer-readable storage medium that may be read and executed by one or more processors on an INE, hardware that can be coupled with an INE, or a standalone device that acts as an intermediary between a trusted network and an INE, among other things. The encrypted data packet with populated pass-through fields 301C is sent to interface 303, which either populates one or more pass-through fields in the data packet 301C to form a new encrypted data packet with populated pass-through fields 301D or reads the already populated pass-through fields of data packet 301C. These fields can be populated in various ways according to the techniques of this disclosure depending on which proxy function is being performed. This encrypted data packet with populated pass-through fields 301D is then either dropped or sent out Black-side interface 306, where it can be further sent to an untrusted network. The encrypted data packet with populated pass-through fields 301C or 301D could also be sent to a proxy function port 305, where a proxy function is executed according to the techniques of this disclosure based on the contents of the pass-through fields. Data packets can also be sent from INE-side interface 304 to an INE device.

FIG. 4A is a diagram with tables showing the bit address of different items on a data packet sent over the INEs. Specifically, the table shows one embodiment of a data packet that could be used in accordance with the techniques of this disclosure. One type of data packet that could be sent is a Start of Sequence (SoS) indication 401. SoS packet 401 is an IPv6 packet in FIG. 4a. SoS packet 401 has three pass-through fields, which are fields that will remain unencrypted when passing through an INE. For example, these pass-through fields are the traffic class field 403, located at bits 4-11, and the flow label field 404, located at bits 12-31. These pass-through fields 403 and 404 can also be populated to read as an End of Sequence (EoS) indication 402 or to represent some other type of message.

Figure 4B:
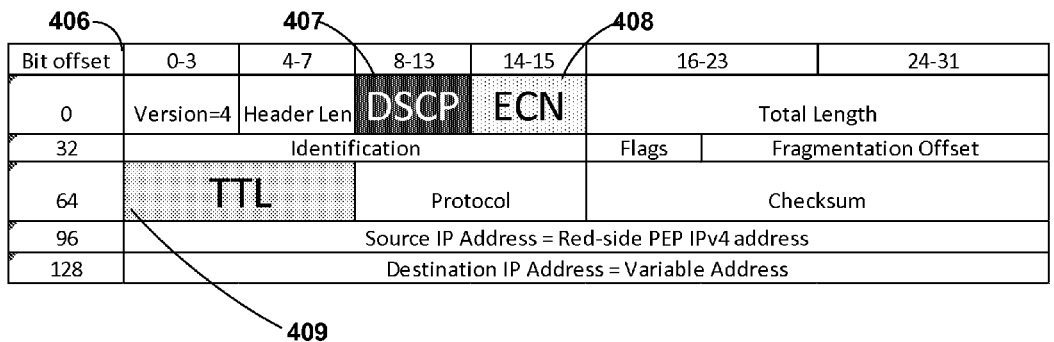

FIG. 4B is an example of an IPv4 data packet. The pass-through fields of IPv4 data packet 406 are located at bit 8-13 and 14-15. The Differentiated Services Code Point (DSCP) field 407 is located at bits 8-13. The Explicit Congestion Notification (ECN) field 408 is located at bits 14-15. These two pass-through fields are not encrypted when passing through certain INEs, such as a HAIPE® device in bypass mode.

Figure 4C:
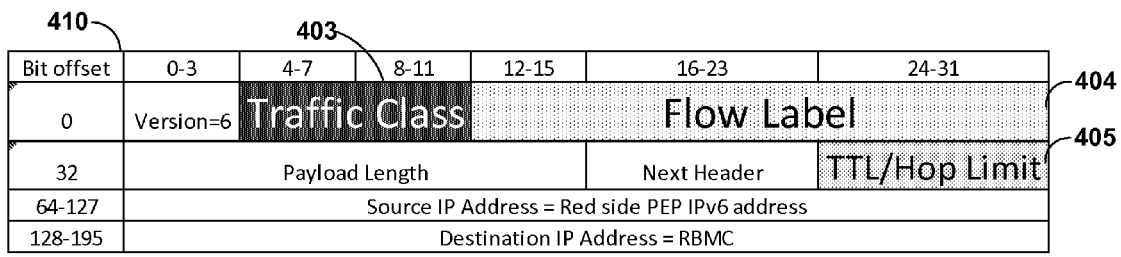

FIG. 4C is an example of an IPv6 data packet. The pass-through fields of IPv6 data packet 410 are located at bits 4-11 and 12-31. The traffic class field 403 is located at bits 4-11. The flow label field 404 is located at bits 12-31. These two pass-through fields are not encrypted when passing through certain INEs, such as a HAIPE® device in bypass mode.

One example method of this disclosure involves a first protocol adapter processing a data packet including one or more pass-through fields. The first protocol adapter then sends the data packet to an INE. A second protocol adapter receives the data packet from the INE. The second protocol adapter reads the pass-through fields. A protocol adapter function is then performed using information in the one or more pass-through fields.

The first protocol adapter could be situated in a trusted network and the second protocol adapter could be situated in an untrusted network. The data packet could be one of an IPv4 packet or an IPv6 packet. The one or more pass-through fields could be any of a traffic class field, a flow label field, an explicit congestion notification field, or a differentiated services code point field. The INE could be a High Assurance Internet Protocol Encryptor (HAIPE®) device. The first protocol adapter and the second protocol adapter could be performance-enhancing proxy (PEP) adapters.

Figure 5:
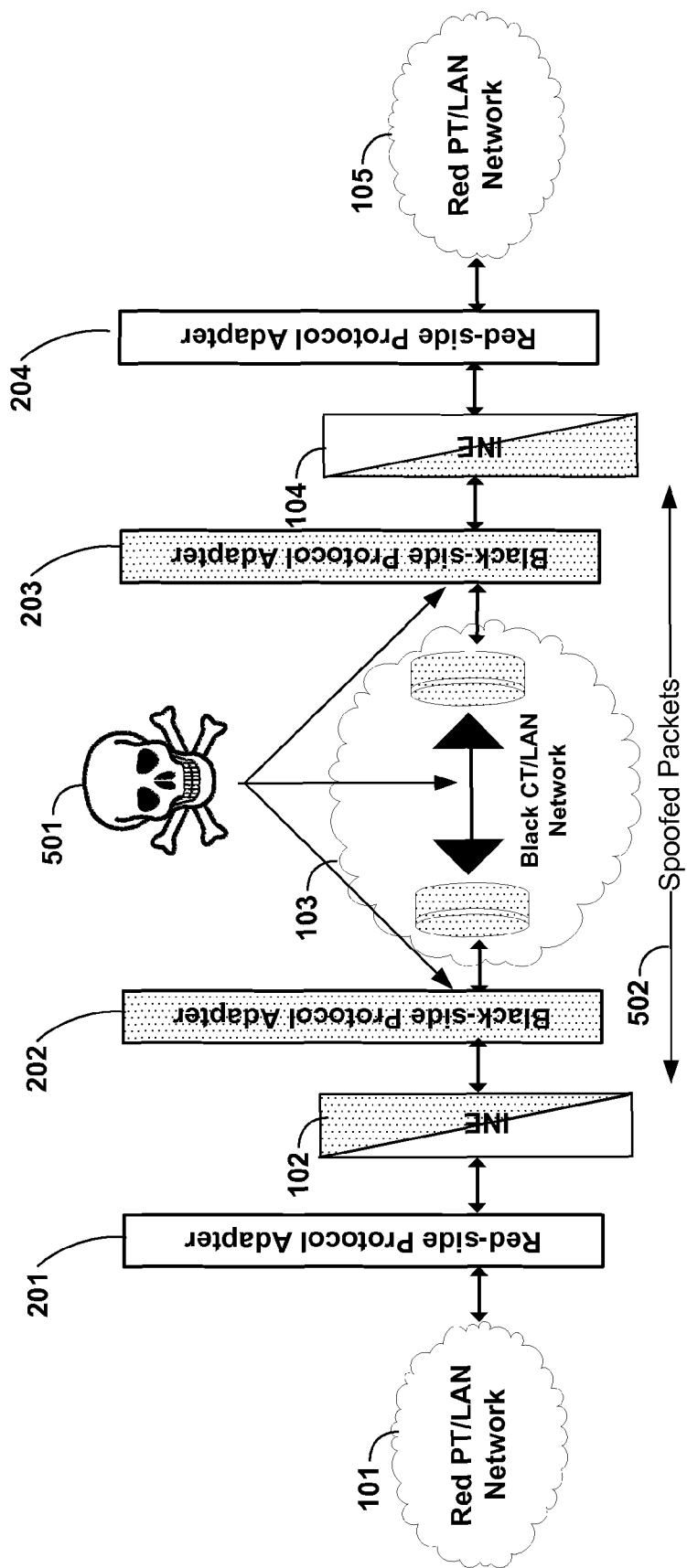
FIG. 5 is a system diagram illustrating an INE-based network with paired protocol adapters configured to detect and mitigate a denial of service attack in accordance with one aspect of the disclosure.

FIG. 5 is a system diagram illustrating an INE-based network with CAPTAIN-enabled protocol adapters configured to perform a performance enhancement function for detecting and/or mitigating a denial of service attack. This is the system of FIG. 2 with the added element of a denial of service attack 501.

A common form of network attack is a "volumetric denial of service" (DoS) attack in which a node is flooded with arbitrary traffic in an attempt to overwhelm its processing resources and saturate its network link. In a crypto-partitioned network this traffic will largely be discarded as it passes from the Black-side of the INE 102 to the Red-side, as spoofed "flood" traffic 502 will not pass any authentication or integrity checks in the INE. However, the fact that the INE 102 (and, thus, the Red-side protocol adapter 201) is under attack is unknown on either side of the INE. It is desirable for the Black-side of the INE to determine when a DoS attack is underway as it may be able to take corrective steps, such as invoking/notifying a Computer Network Defense (CND) service.

To accomplish this, both the first Red-side protocol adapter 201 and the first Black-side protocol adapter 202 are configured to maintain counters of the number of bytes or frames that each protocol adapter has received. Periodically, the first Red-side protocol adapter 201 will send a command sequence to the first Black-side protocol adapter 202 containing the traffic counts at the first Red-side protocol adapter 201, followed by the first Red-side protocol adapter 201 resetting its counter. Upon receipt of this command sequence the first Black-side protocol adapter 202 will compare the traffic counts at the first Red-side protocol adapter 201 to the counter at the first Black-side protocol adapter 202. If the first Red-side protocol adapter 201 is receiving substantially less traffic than the first Black-side protocol adapter 202, then it is likely that a DoS attack 501 is present. If the system detects that a DoS attack 501 is present, Black network 103 can take corrective steps. These corrective steps could be any number of cyber defense proxy functions, including invoking a Computer Network Defense (CND) service or notifying a CND service. Otherwise, the counter at the first Black-side protocol adapter 202 will reset, and the overall system continues to run. While this description applies to the first Red-side protocol adapter 201, the first Black-side protocol adapter 202, the first Red network 101, and the Black network 103, this same process could be run on the second Red-side protocol adapter 204, the second Black-side protocol adapter 203, the second Red network 105, and the Black network 103.

As discussed above, in one example of the disclosure, the performance enhancing proxy function is a cyber defense proxy function. In this example, the techniques of this disclosure may further include measuring, at a first protocol adapter (e.g. red-side protocol 201) with a first counter, an amount of data received by the first protocol adapter. A second proxy (e.g. black-side protocol 202) adapter measures an amount of data received by the second protocol adapter with a second counter. The first protocol adapter sends the amount of data measured by the first protocol adapter to the second protocol adapter in one or more pass-through fields of a data packet. The second protocol adapter reads the one or more pass-through fields that contain the amount of data measured by the first counter in the first protocol adapter. The second protocol adapter then compares the amount of data measured by the first counter to the amount of data measured by the second counter by the second protocol adapter. A cyber defense proxy function may be implemented in the case that the amount of data measured by the first counter differs from the amount of data measured by the second count by a threshold.

Figure 6:
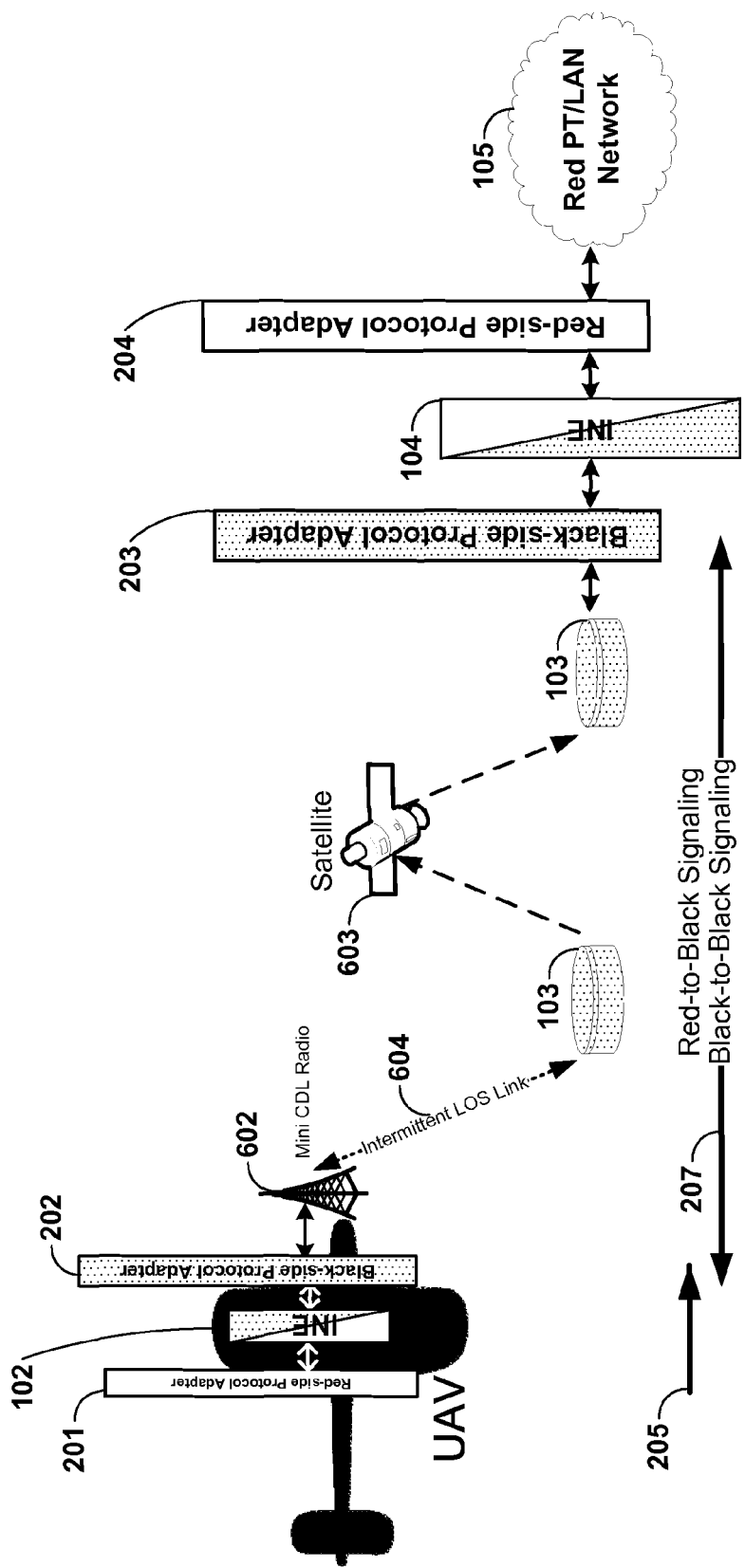
FIG. 6 is a system diagram illustrating an INE-based network with paired protocol adapters configured to implement a disruption tolerant network proxy function according to one aspect of the disclosure.

FIG. 6 is a system diagram illustrating an INE-based network with CAPTAIN-enabled protocol adapters configured to implement disruption tolerant network PEP functions. Disruption Tolerant Networking (DTN) protocols are extremely useful in cases where network connections are known a priori to be intermittent or episodic in nature. An application wishing to transfer application data (for instance, a large data file) can employ a DTN protocol to divide this application data into discrete "bundles" which are each small enough to be reliably transferred during expected network "up-time" periods or episodes. The application data and, where necessary, individual data bundles in transit, are buffered during network "down-time", and may even be moved to secondary/disk storage for extended disruptions or very large buffer sizes.

DTN Bundling protocols are problematic within traditional crypto-partitioned network environment. The protocols rely on the transfer of "bundles", but a Red-side DTN application is typically unable to determine whether a bundle has been successfully transferred to the "next hop" on the Black network. As far as a Red-side DTN application is concerned, the "next hop" is also on the Red-side in another enclave—the Black network is "invisible." Thus, DTN applications on the Red-side network cannot operate correctly in the face of network disruptions within the Black network. For disruptions/delays on the Black network on the order of 30 seconds or more TCP-based flows break down completely, rendering many DTN Bundling protocols totally inoperable in such an environment. In essence DTN applications must treat the entire Black-side network as a single hop. Thus, disruptions in the Black-side network which DTN itself could handle can break the DTN flows.

The techniques of this disclosure may overcome this problem by using the CSP to designate the bundle boundaries of a Red-side DTN flow to DTN agents on the Black-side. Once the Black-side is aware of the bundle-structure of the DTN flow, the Black-side protocol adapters (black-side protocols) and routers within the Black network can use DTN protocols to ensure that bundles are buffered and transferred appropriately until they eventually emerge again into a Red-side protocol adapter.

In one example, the first Red-side protocol adapter 201 processes a data packet to become a start of sequence packet. The data packet is sent from the first Red-side protocol adapter 201 to the INE 102 and forwarded to the first Black-side protocol adapter 202 along Red-to-Black signaling line 205, where it is held. The first Red-side protocol adapter 201 then sends at least one additional data packet to the INE 102. The first Black-side protocol adapter 202 then receives the at least one additional data packet from the INE 102 along Red-to-Black signaling line 205, where they are again held in the order that they are received by the first Black-side protocol adapter 202. The data packets could also be processed in such a way that the data packets contain a counter in one of the pass-through fields, such that the counter represents the order in which the data packets should be sent. When the first Black-side protocol adapter 202 receives the marked data packets, the first Black-side protocol adapter 202 encapsulates each packet into a DTN bundle which are individually forwarded to the next destination in the chain, such as the second Black-side protocol adapter 203 along the Black-to-Black signaling line 207. This process could be repeated between the first Black-side protocol adapter 202 and the second Black-side protocol adapter 203, as well as the second Black-side protocol adapter 203 and the second Red-side protocol adapter 204.

As discussed above, in one example of the disclosure, the performance enhancing proxy function is a disruption tolerant networking (DTN) proxy function. In this example, the techniques of this disclosure may further include inserting in at least one of the one or more pass-through fields, by a first protocol adapter (e.g. red-side protocol 201), a start of sequence indication. The first protocol adapter then sends at least one additional data packet to an INE (e.g. INE 102), which is then received by a second protocol adapter (e.g. black-side protocol 202), where all received data packets are stored and forwarded using DTN protocols running in the Black network. A chain of black side protocol adapters may exist between 201 and 202 on the black network. These intermediate protocol adapters serve to buffer and forward the packets along the network path from 201 to 202 despite link disruptions in that path. Eventually, the receiving Red-side protocol adapter 204 receives all the data and sends an acknowledgement back to the sending Red-side protocol adapter 201, at which point the transfer is complete. If the acknowledgement is not received at 201 within the specified timeout, the whole transfer is redone.

Figure 7:
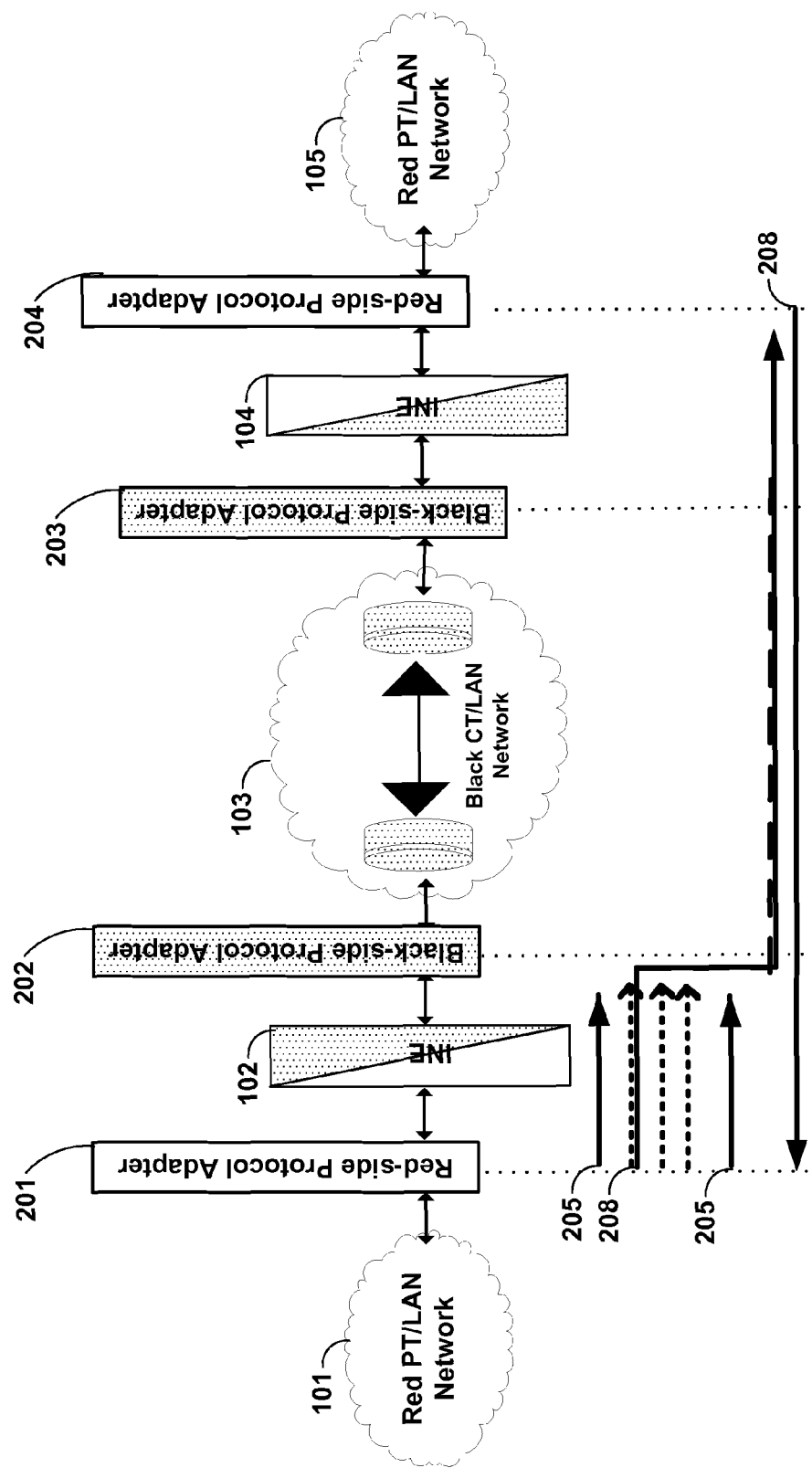
FIG. 7 is a system diagram illustrating an INE-based network with paired protocol adapters configured to implement an on-demand signal sequence of events according to one aspect of the disclosure.

FIG. 7 is a system diagram illustrating an INE-based network with CAPTAIN-enabled protocol adapters configured to implement an on-demand signaling protocol. The general approach of on-demand signaling is that the Red-side protocol adapters generate a group of packets on-demand, with each packet representing a particular "outcome" for some operation. The Black-side protocol adapters are configured to pass on only one packet to indicate the desired state or outcome. The selected packet is forwarded across the Black network to a particular Red-side protocol adapter, which echoes it back for delivery to the Red-side protocol adapter on the originating side.

On-Demand Black-to-Red signal packets would be in response to a request from a Red-side protocol adapter, all part of a Red-to-Black "On-Demand" signal sequence, i.e., any Red-to-Black sequence that requires a detailed Black-to-Red response. A source Red-side protocol adapter would issue a sequence of data packets within its start/end of sequence packets, each having a meaning to the SOS indications being issued. The Black-side protocol adapter on the originating side would intelligently link those X packets to information that it would like the source Red-side protocol adapter to have. The source Black-side protocol adapter would forward the chosen data packet through the network. The receiving Red-side protocol adapter would see the indication that passed through the network from the originating Red-side protocol adapter and respond by echoing the packet back.

For example, in FIG. 7, first Red-side protocol adapter 201 issues the "On-Demand" SOS with a fixed number of data packets along Red-to-Black signaling line 205. For instance, the first Red-side protocol adapter 201 might issue 5 data packets with (by prior agreement) the first data packet corresponding to 1 GBps, the second to 100 MBps, the third to 10 MBps, the fourth to 1 MBps, and the fifth to 100 KBps. Although bandwidth is being requested in this example, the network metric being requested could be a variety of different network metrics, including latency, reliability, or hop count, among other things. The first Black-side protocol adapter 202 will read the SOS packet to determine which network metric is being requested. This first Black-side protocol adapter 202 will be configured to measure a variety of network metrics, including bandwidth. So long as the first Black-side protocol adapter 202 is configured to measure the requested network metric, the first Black-side protocol adapter 202 will determine the actual value of the requested network metric. The first Black-side protocol adapter 202 chooses one of the five data packets that most closely corresponds to the measured network metric and lets that single data packet go through to the second Red-side protocol adapter 204 along the Red-to-Red signaling line 208. The second Red-side protocol adapter 204 echoes the originating packet back to first Red-side protocol adapter 201 along Red-to-Red signaling line 208. The first Red-side protocol adapter 201 gets back a single packet that has been chosen by the first Black-side protocol adapter 202 to indicate its current state. If the current bandwidth was 100 MBps, the first Black-side protocol adapter 202 would select the second packet as the one sent towards the second Red-side protocol adapter 204.

In another example, instead of sending a plurality of data packets from the first Red-side protocol adapter 201 to the first Black-side protocol adapter 202, the first Black-side protocol adapter 202 could store the plurality of data packets and perform a stored signaling function. According to a schedule, the first Black-side protocol adapter 202 could measure or determine a network metric. Once the network metric is measured, the first Black-side protocol adapter 202 could send a data packet that corresponds to the value of that network metric to a second Red-side protocol adapter 204.

As discussed above, in one example of the disclosure, the performance enhancing proxy function is a stored signaling function. In this example, the techniques of this disclosure may further include storing, at the second protocol adapter (e.g. black-side protocol 202), a plurality of data packets, wherein a value of a network metric is included in the one or more pass-through fields for each of the plurality of data packets. The second protocol adapter would then read, in accordance with a schedule, the network metric indicated by the values in the one or more pass-through fields for each of the plurality of data packets. The second protocol adapter then forwards one of the plurality of data packets that corresponds to the correct value of the network metric to a third protocol adapter (e.g. red-side protocol 204) located in a second trusted network (e.g. Red network 105).

Figure 8:
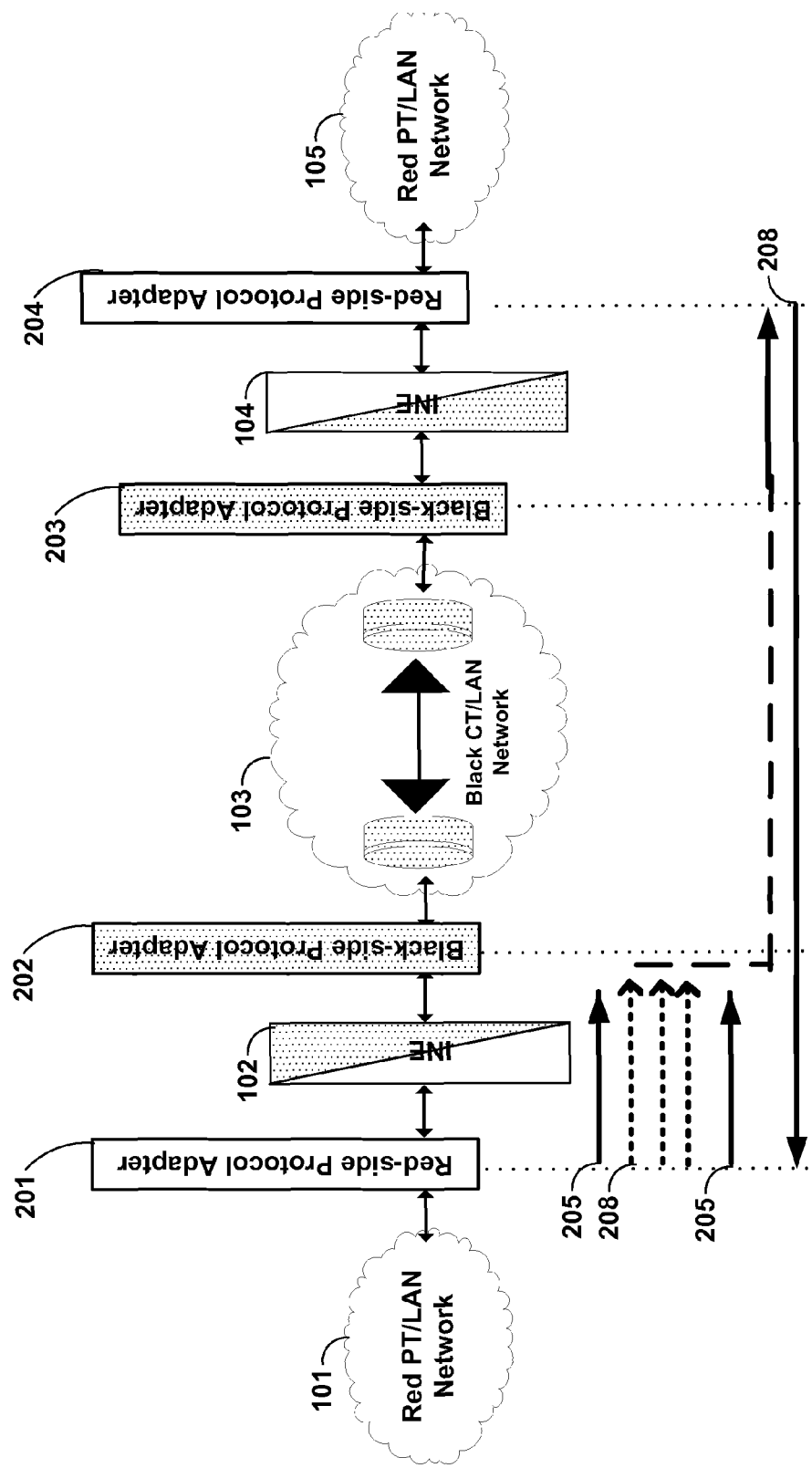
FIG. 8 is a system diagram illustrating an INE-based network with paired protocol adapters configured to implement a function that reports network statistics.

FIG. 8 is a system diagram illustrating an INE-based network with CAPTAIN-enabled protocol adapters configured to detect bandwidth and/or bit error rates and to implement network sensing proxy functions. In one example of the disclosure, CSP along with multi-function paired protocol adapters may be configured to provide Black-side network sensing to applications on the Red-side. This task will also incorporate implementing the messaging format for a third party protocol adapter to gather the network sensing information. Determination of the perceived bandwidth and/or the BER will enable a Red-side protocol adapter to invoke various measures such as forward error-correction, routing decisions or traffic prioritization to achieve desired performance when links are degraded. In crypto-partitioned networks knowledge of network characteristics such as bandwidth, bit error rates (BER) and latency in the Black network are invisible to the Red-side. CAPTAIN signaling would give the Red enclaves control that they don't currently have in a crypto-partitioned network.

Periodically, the first Red-side protocol adapter 201 will send a data sequence along the Red-to-Black signaling line 205 to the first Black-side protocol adapter 202 which instructs the first Black-side protocol adapter 202 to report the available bandwidth on a particular path. The first data packet sent would indicate a start of sequence indication. The "intermediate" data packets of the data sequence will each be addressed to the desired endpoint of the path to be sensed and could consist of 10 frames, corresponding to the 10 increments (1 to 10 Mbps). The final data packet sent would indicate an end of service indication. The first Red-side protocol adapter 201 may be configured to insert a data item into one of the one or more pass-through fields within each frame, indicating which type of data they pertain to. These frames will be received by the first Black-side protocol adapter 202, but it will only forward the frame corresponding to the correct bandwidth value through to the desired endpoint, a second Red-side protocol adapter 204. The second Red-side protocol adapter 204 will then echo the data packet, which contains the correct value of the measured network metric, back to the first Red-side protocol adapter 201 along the Red-to-Red signaling line 208 which will read the data item within the frame and thus determine the available bandwidth. Although bandwidth is measured in this example, the network metric could be a different network metric, including latency, bit-error rate, reliability, or hop count, among other things.

As discussed above, in one example of the disclosure, the performance enhancing proxy function is a network sensing proxy function. In this example, the techniques of the disclosure may further include sending, with a first protocol adapter (e.g. red-side protocol 201), a data sequence including a plurality of data packets to a second protocol adapter (e.g. black-side protocol 202), wherein a value of a network metric is included in the one or more pass-through fields for each of the plurality of data packets. The first data packet of the plurality of data packets will always indicate a start of sequence indication, and the final data packet of the plurality of data packets will always indicate an end of sequence indication, while all of the intermediate data packets will include a possible value of a network metric. In response to receiving the data sequence, the second protocol adapter determines an actual value for the requested network metric. The second protocol adapter then forwards the one of the plurality of data packets to a third protocol adapter (e.g. red-side protocol 204) that corresponds to the actual value of the network metric. The third protocol adapter then sends a data packet back to the first protocol adapter. Optionally, the first protocol adapter can then perform a network management function in the case that the actual value of the network metric indicates a degraded link.

Figure 9:
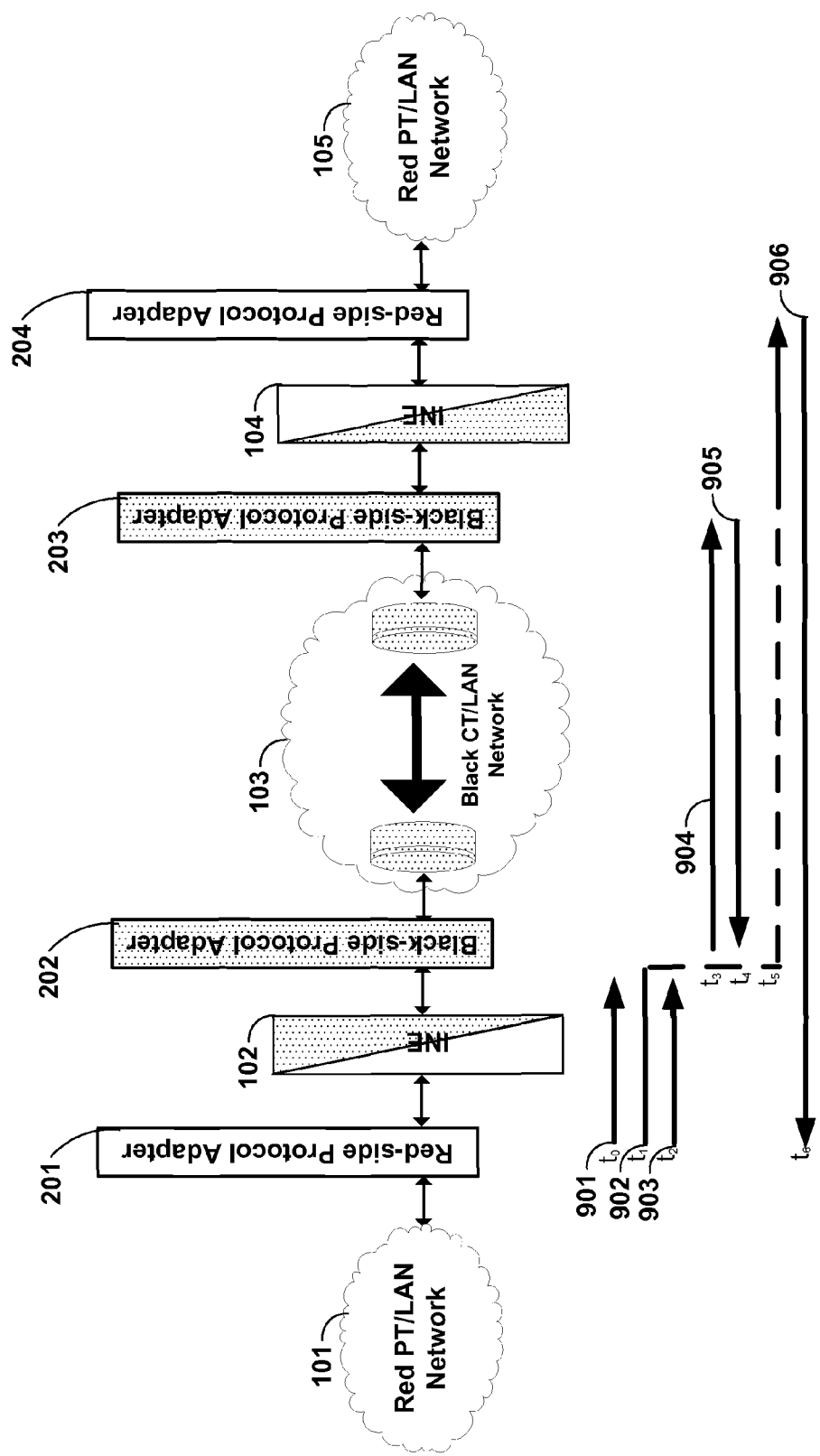
FIG. 9 is a system diagram illustrating an INE-based network with paired protocol adapters configured to ensure quality of service (QoS) sequencing.

FIG. 9 is a system diagram illustrating an INE-based network with CAPTAIN-enabled protocol adapters that demonstrates quality of service (QoS) provisioning. Red-side applications may need to reserve bandwidth over the Black network on a per-security association basis, essentially providing a bandwidth guarantee for the IPSEC tunnel connecting two Red protocol adapters. Even if such a Red-Red reservation is made, the Black-side network has no way of knowing about or honoring the reservation. Practically, the presence of the Black network negates the ability of the Red enclaves to make meaningful QoS reservations between each other, as congestion or bandwidth limitations in the Black network can limit performance unbeknownst to the Red-side.

The CAPTAIN multi-function proxy, using both the Red-side and Black-side protocol adapters around the INEs, will allow for a reservation to be made validly and accepted across both the Red and Black networks. The Black-side protocol adapters in conjunction with the Red-side protocol adapters will use their processing to indicate back to the reserving Red-side protocol adapter if the requested reservation passed or failed.

At a high level, the CSP for QoS will allow the first Red-side protocol adapter to make a matching Black-to-Black reservation for each desired Red-to-Red reservation. The second Red-side proxy will have received notice from second Black-side proxy as to whether the Black reservation passed or failed. The second Red-side protocol adapter will then issue a Red-to-Red response packet to the source, the first Red-side protocol adapter.

Referencing FIG. 9, the first red-side protocol adapter 201 sends an SOS data packet to the first Black-side protocol adapter 202 via the INE 102 to initiate a bandwidth reservation request along red-to-black signaling line 901. The first red-side protocol adapter 201 then sends a second data packet to a second red-side protocol adapter 204 along red-to-red signaling line 902, wherein the second data packet indicates a desired bandwidth. The first red-side protocol adapter 201 then sends a third data packet to the first black-side protocol adapter 202 along red-to-black signaling line 903, wherein the third data packet indicates an end of sequence packet. The first black-side protocol adapter 202 then attempts to reserve the requested bandwidth in Black network 103 according to a reservation protocol. This reservation protocol could be Resource Reservation Protocol (RSVP), among other things. The Black network 103 will send a response to the first black-side protocol adapter 202, wherein the response is an indication of one of success or failure in reserving the bandwidth. The first black-side protocol adapter 202 then encapsulates the second data packet to the second black-side protocol adapter 203. During this encapsulation process, information regarding the success or failure in reserving bandwidth indicated by the response to the request sent by the Black network 103 is added to an outer wrapper of the second data packet. The second black-side protocol adapter 203 then unencapsulates the second data packet. The second black-side protocol adapter 203 then sends the unencapsulated second data packet to a second INE 104. The second INE 104 then copies the outer wrapper's unencapsulated explicit congestion notification bits of the second data packet into a set of explicit congestion notification bits. After all of these events have occurred, the second data packet is received and read by the second red-side protocol adapter 204. The second red-side protocol adapter 204 then reads the explicit congestion notification bits in the data packet. Finally, the second red-side protocol adapter 204 sends a fourth data packet to the first red-side protocol adapter 201 along red-to-red signaling line 906, wherein the fourth data packet is an indication of acceptance or denial of the bandwidth reservation request.

As discussed above, in one example of the disclosure, the performance enhancing proxy function is a quality-of-service management proxy function. In this example, the techniques of the disclosure further include sending a first data packet from a first protocol adapter (e.g. red-side protocol 201) to a second protocol adapter (e.g. black-side protocol 202), wherein the first data packet includes a bandwidth reservation request. The first protocol adapter then sends a second data packet to the second protocol adapter, wherein information in the header of the second data packet indicates a desired destination. The first protocol adapter then sends a third data packet to the second protocol adapter, wherein information in the one or more pass-through fields in the third data packet indicates an end-of-sequence packet. After receiving these three packets, the second protocol adapter will attempt to reserve the requested amount of bandwidth within an untrusted network (e.g. Black network 103) according to a reservation protocol. At this point, the untrusted network sends a response of success or failure back to the second protocol adapter. The second protocol adapter then encapsulates the second data packet at the second protocol adapter to the third protocol adapter, wherein the encapsulating further comprises adding information regarding the success or failure in reserving bandwidth indicated by the response to the request sent to the untrusted network to an outer wrapper of the second data packet. The third protocol adapter then unencapsulates the second data packet before delivering the unencapsulated second data packet to a second INE (e.g. INE 104). The second INE copies the outer wrapper of the unencapsulated second data packet into a set of explicit congestion notification bits at the second INE. A fourth protocol adapter (e.g. red-side protocol 204) located in a second trusted network (e.g. Red network 105) then reads the explicit congestion notification bits of the data packet. Finally, the fourth protocol adapter sends a fourth data packet from the fourth protocol adapter to the first protocol adapter, wherein the packet's data is an indication of acceptance or denial of the bandwidth reservation request.

The CAPTAIN multi-function protocol adapter will provide the capability to conserve bandwidth by pruning unnecessary multicast traffic in the Black core. It will also provide functionality that can be used or leveraged to implement PIM-SSM across INEs.

Figure 10:
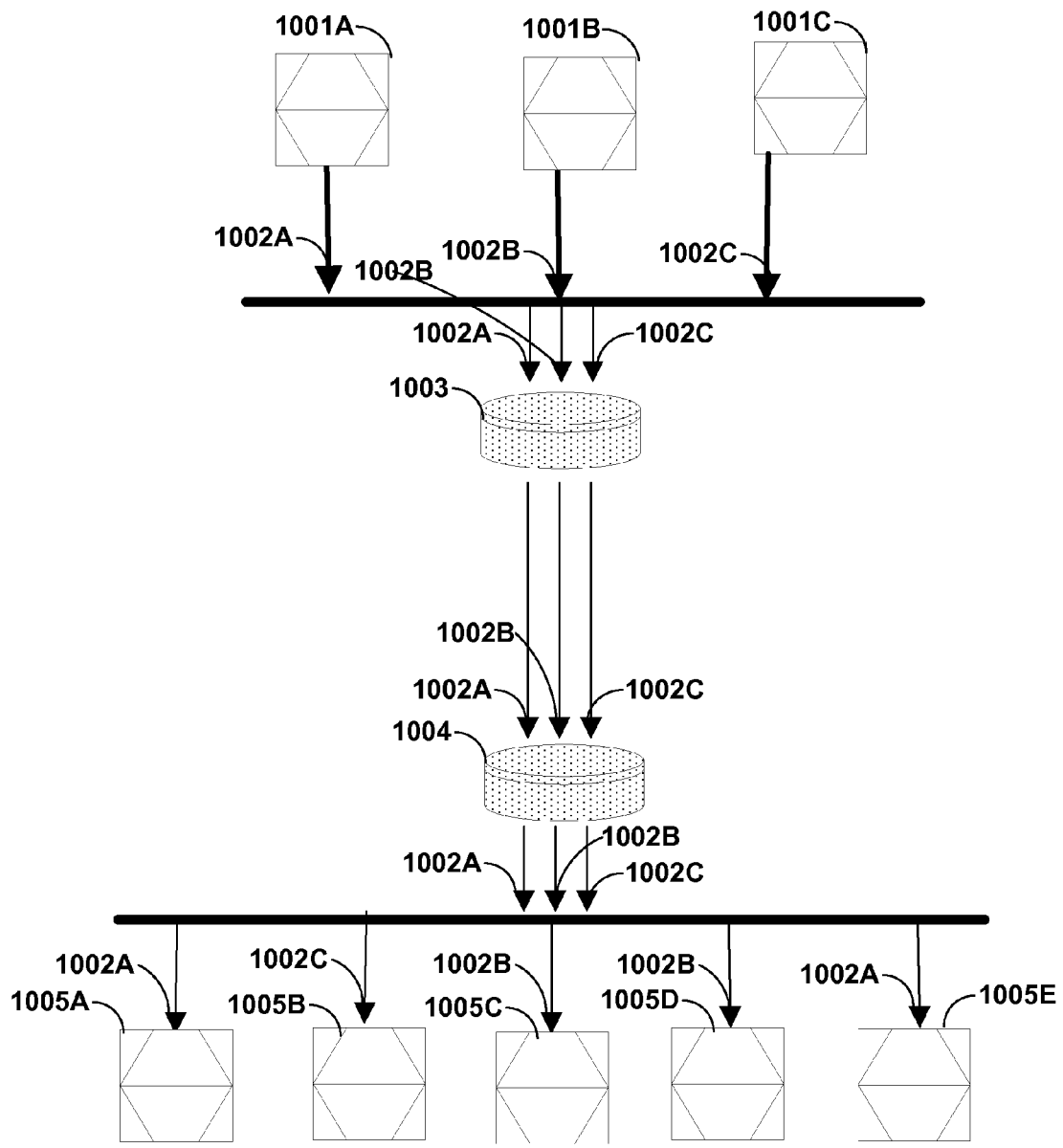
FIG. 10 is a system diagram illustrating a multicast network.

FIG. 10 is a system diagram illustrating a multicast network. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 go through a first router 1003 and a second router 1004, each of which is in a wide-area network (WAN). These routers could be connected by communications links such as satellite communication (SATCOM) links, among other things. The IP multicast flows finally go to a second LAN site with receivers 1005A, 1005B, 1005C, 1005D, and 1005E (collectively, "the receivers 1005). If used in a tactical network, the receivers 1005 could represent workstations used by intelligence analysts to monitor the surveillance video streams in real time, among other things, though it is not necessary for these to be in a tactical network.

The receivers 1005 must "Join" and "Leave" each multicast flow that they wish to subscribe to. Using a pre-defined multicast protocol, such as PIM-SSM, a specific receiver 1005A-E would communicate with second router 1004 of its desire to "Join" or "Leave" a specific flow 1002A-C. The second router 1004 communicates this operation to the first router 1003, which handles the traffic management of the flows 1002. If none of the receivers 1005 are subscribing to a given flow 1002A, 1002B, or 1002C, the first router 1003 does not send that flow across the black network, conserving bandwidth in the system.

Figure 11:
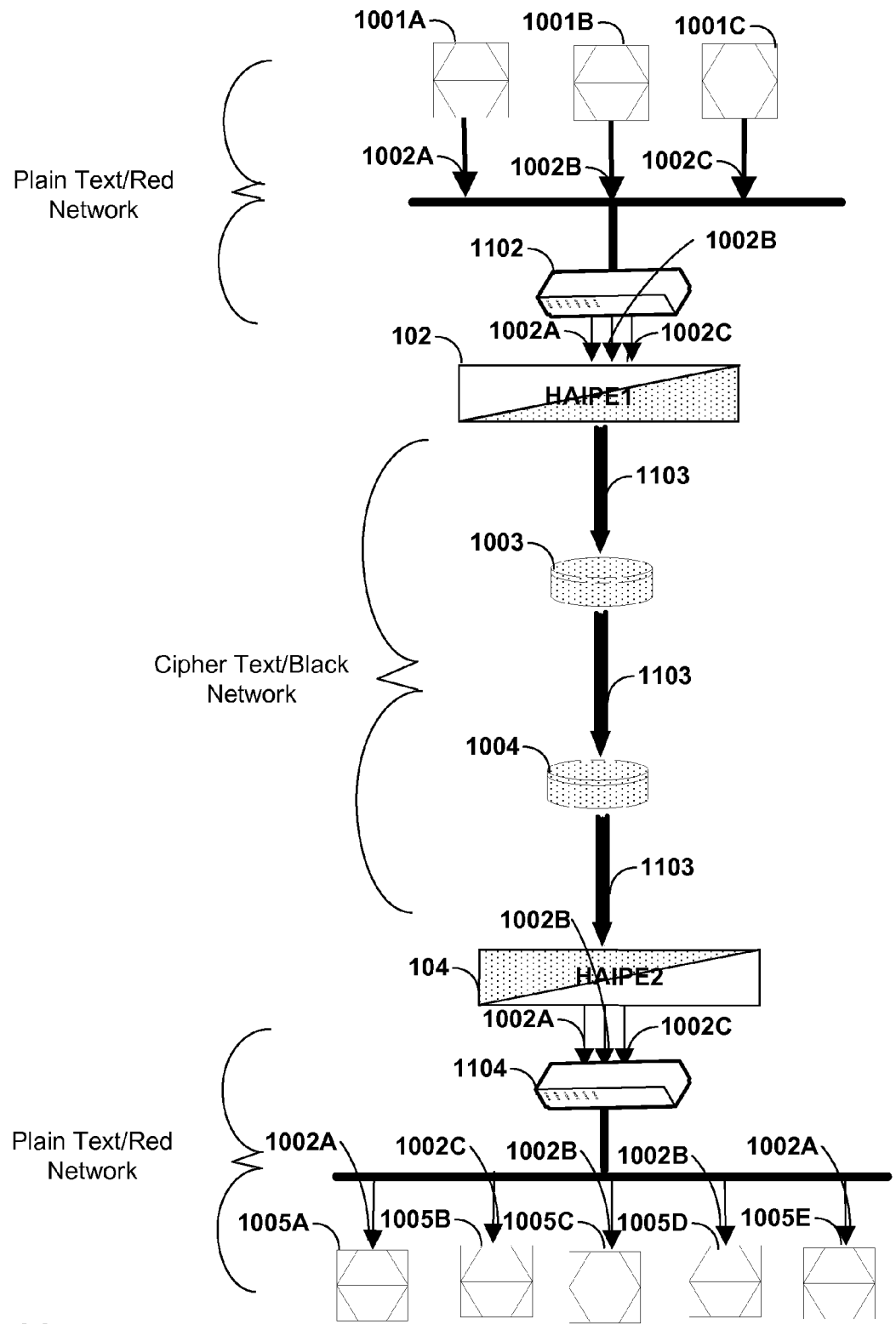
FIG. 11 is a system diagram illustrating an INE-based multicast network.

FIG. 11 is a system diagram illustrating an INE-based multicast network. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 are funneled through a first switch 1102 before being sent to a first INE 102. The flows 1002 go through encrypted multicast tunnel 1103 then go to a first router 1003 and a second router 1004, each of which is in a wide-area network (WAN). These routers could be connected through communication links such as satellite communication (SATCOM) links, among other things. The encrypted multicast tunnel 1103 then goes through a second INE 104, where it is decrypted back into flows 1002A-C. The flows 1002 are sent through a second switch 1104 to allow for multicast distribution. Finally, the flows 1002 go to a second LAN with receivers 1005A, 1005B, 1005C, 1005D, and 1005E (collectively, "the receivers 1005). If used in a tactical network, the receivers 1005 could represent workstations used by intelligence analysts to monitor the surveillance video streams in real time, among other things, though it is not necessary for these to be in a tactical network.

These multicast networks can lead to inefficiency. The multicast network of FIG. 10 is not a secure multicast network, as no encryption takes place. In the multicast network of FIG. 11, when the flows 1002 are encrypted and combined into multicast tunnel 1103, the source address of each individual flow 1002A, 1002B, and 1002C can no longer be read. Therefore, if one of the receivers 1005 wishes to leave a subscription, and no other receivers are subscribing to a particular flow 1002A, 1002B, or 1002C, that particular flow is still sent through the black network 103, using valuable bandwidth unnecessarily.

Figure 12:
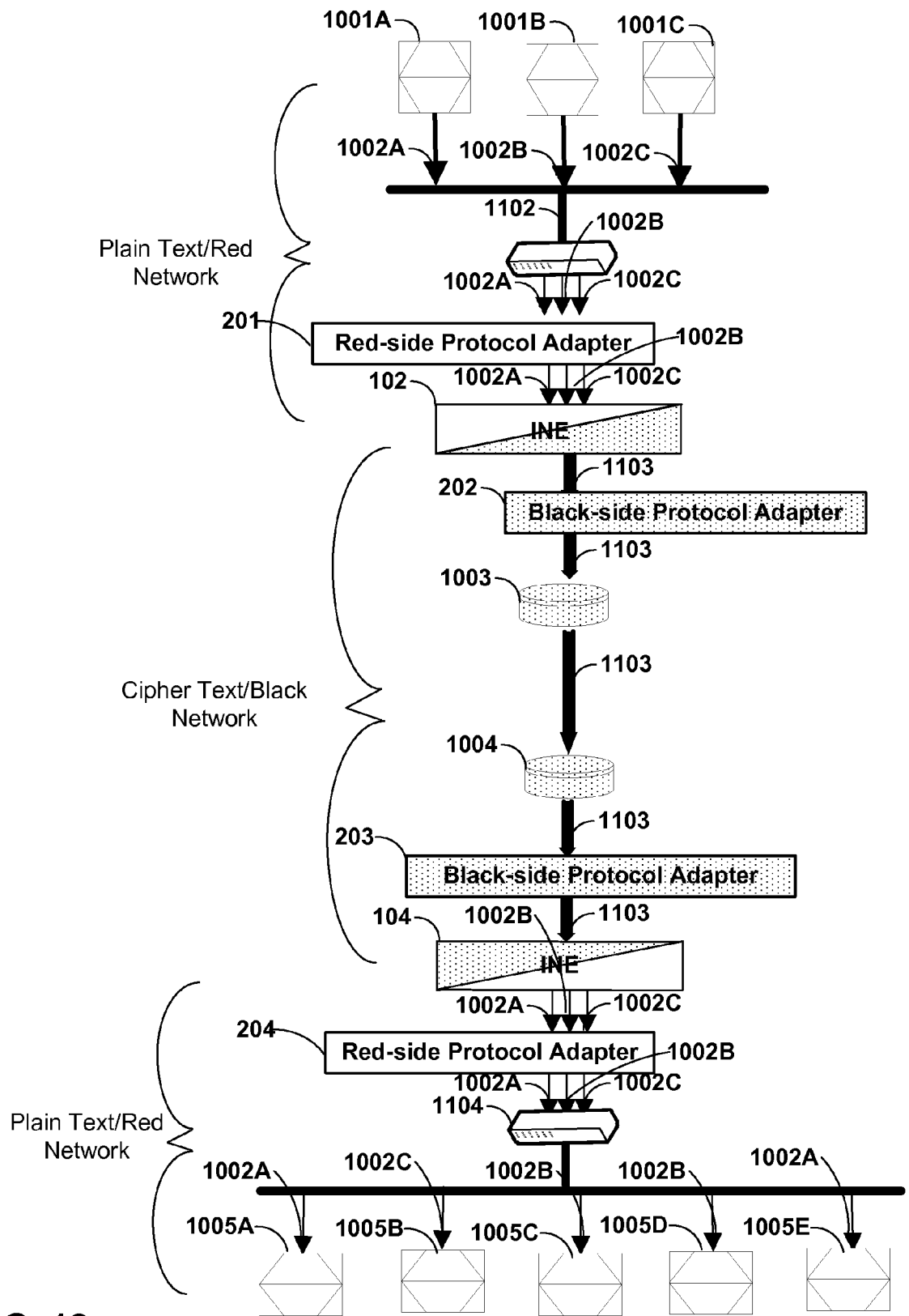
FIG. 12 is a system diagram illustrating an INE-based multicast network with paired protocol adapters.

FIG. 12 is a system diagram illustrating an INE-based multicast network with CAPTAIN-enabled protocol adapters. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 go through a first red-side protocol adapter 201 before going through a first INE 102. Encrypted multicast groups 1103 then go to a first black-side protocol adapter 202 before going to a first router 1003 and a second router 1004, each of which is in a wide-area network (WAN). These routers could be connected by communications links such as satellite communication (SATCOM) links, among other things. The encrypted multicast tunnel 1103 then goes through a second black-side protocol adapter 203. The encrypted multicast tunnel 1103 then gets sent to a second INE 104, where it is decrypted back into individual flows 1002A, 1002B, and 1002C. A second red-side protocol adapter 204 receives the decrypted flows 1002 from the second INE 104. Finally, the flows 1002 go to a second LAN with receivers 1005. If used in a tactical network, the receivers 1005 could represent workstations used by intelligence analysts to monitor the surveillance video streams in real time, among other things, though it is not necessary for these to be in a tactical network.

Using the setup in FIG. 12, a variety of proxy functions can be performed. One such function is a multicast traffic management proxy function. This will provide functionality that allows the Red-side protocol adapter from which multicast flows are being sent to tag the individual flows. Its companion Black-side can then use a Network Address Translation (NAT) operation on the Black-side, assigning each multicast flow a unique source address on the Black network. This "Source NAT" function will allow the Red-side and Black-side protocol adapters on the receiving end of the multicast flows to subscribe using Source-Specific Multicast. This allows disaggregation of the flows in the tunnel whose destination is multicast address M, since each flow addressed to M has its own unique source address. By disaggregating the flows and allowing individual subscriptions on the Black-side, the disclosure will allow for much more efficient usage of network resources, since only the multicast traffic desired or subscribed to in a particular Red-side network will be forwarded to the enclave.

Referring to FIG. 12, the first Red-side protocol adapter 201 distinguishes multicast flows by tagging individual packets based on either the source address, the multicast destination, or a combination of the two. This tagging information is sent to both the first Black-side protocol adapter 202 and to the second Red-side protocol adapter 204 which subscribes to the multicast. The first Black-side protocol adapter 202 uses this tagging information in a NAT operation to assign a unique source address to the data packets with a given tag. The second Red-side protocol adapter 204 will send subscription information to its companion Black-side protocol adapter 203, which will perform a source-specific "Join" operation on the mapped source address, which correspond to traffic from one of the senders 1001A-C. When there are no receivers 1005A, 1005B, 1005C, 1005D, and 1005E (collectively, "the receivers 1005) left subscribing to an individual flow 1002A, 1002B, and 1002C (collectively, "the flows 1002"), the second Red-side protocol adapter 204 will send a notice to its companion Black-side protocol adapter 203 to perform a "Leave" operation on the specified source. These "Join" and "Leave" operations are communicated to the second router 1004 and the first router 1003 using a pre-defined multicast protocol, such as PIM-SSM. The first Black-side protocol adapter 202 will receive notice of these "Leave" operations from the first router 1003, which will notify the first Black-side protocol adapter 202 of the address of the specific flow 1002A, 1002B, or 1002C that has no receivers 1005 subscribing to it. If this occurs, the first Black-side protocol adapter 202 will stop any packets containing source address corresponding to the specific flow with no subscriptions from traversing the black network, conserving bandwidth within the network.

Another protocol adapter function that can be performed in this setup is a multicast congestion control function. Using the multicast traffic management proxy function above, this technique further involves giving priorities to each individual multicast flow. Each router 1003 and 1004 is configured to provide Explicit Congestion Notification (ECN) functionality. If congestion is encountered, the ECN bits in the IP packet header will be set to a value that indicates congestion for packets traversing a congested link on the router. If these bits are set to a value that indicates congestion, the ECN bits of a data packet traversing the network will be set by the routers 1003 and/or 1004. These bits will be read at the second Black-side protocol adapter 203. If congestion is detected, the second Black-side protocol adapter will notify the second Red-side protocol adapter 204 of the congestion. The second Red-side protocol adapter 204 contains a listing of priorities associated with each of the individual flows 1002A, 1002B, and 1002C. The second Red-side protocol adapter will then issue a "Leave" operation for whichever of the flows has the lowest priority, following the same protocol for a "Leave" operation as described above. This process is repeated until the network is no longer considered "congested". The second Black-side protocol adapter 203 will continue to monitor the ECN bits set by the routers 1003 and 1004, and will forward a notification to the second Red-side protocol adapter 204 when the ECN bits are set to not congested.

Figure 13:
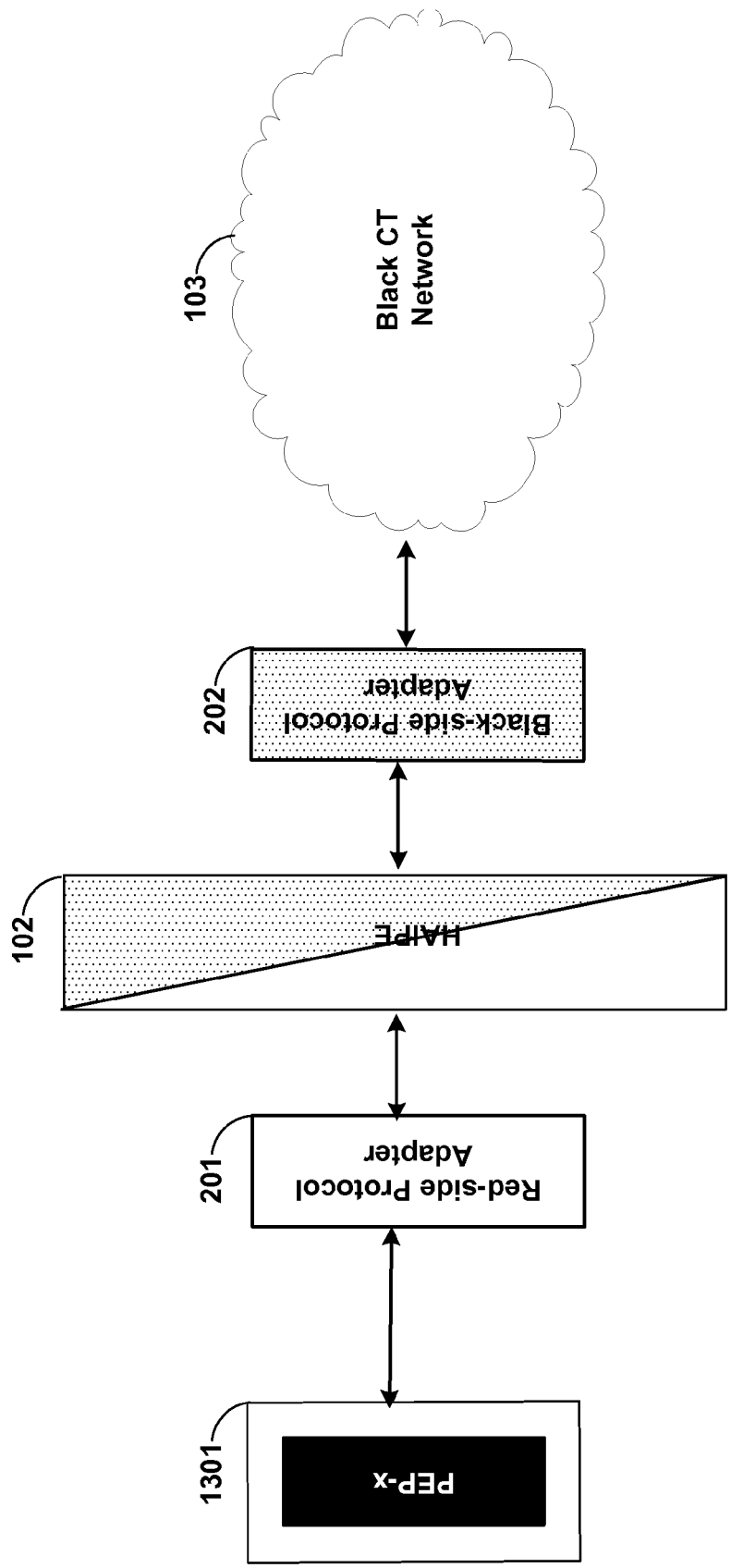
FIG. 13 is a system diagram illustrating protocol adapters.

FIG. 13 is a system diagram illustrating the use of CSP and paired protocol adapters as a protocol adapter. CAPTAIN is intended as a multi-function implementation, which may operate as a stand-alone protocol adapter for the functions that we have defined, or as an adapter for existing protocol adapters that need to exploit extra knowledge about the communications taking place and/or the structure of the underlying network to improve performance. Unfortunately, in traditional encryption techniques, the information they use to enhance performance is removed from the network traffic by the encryption process employed in the Black network. This stripping of information from the traffic makes many existing protocol adapters unusable in a crypto-partitioned network. The CSP, in conjunction with red-side and black-side protocol adapters around the INEs will act as a proxy to existing protocol adapters, to provide them the network information that they need to operate.

An existing Red-side performance enhancing proxy (PEP) 1301 in the figure uses a separate CAPTAIN-enabled Red-side protocol adapter 201 to facilitate communication with, and across, INE 102 into the black network 103 via the first black-side protocol adapter 202 and to gain access to the extra information it needs to perform its network optimizing functions. This approach allows for the full power of CAPTAIN and the CSP to be made available to existing protocol adapters. In order to allow existing protocol adapters, such as existing Red-side protocol adapter 1301, to communicate with CAPTAIN-enabled protocol adapters, such as Red-side protocol adapter 201, a definition of a messaging protocol could be provided to vendors of non-CAPTAIN-enabled PEPs.

Figure 14:
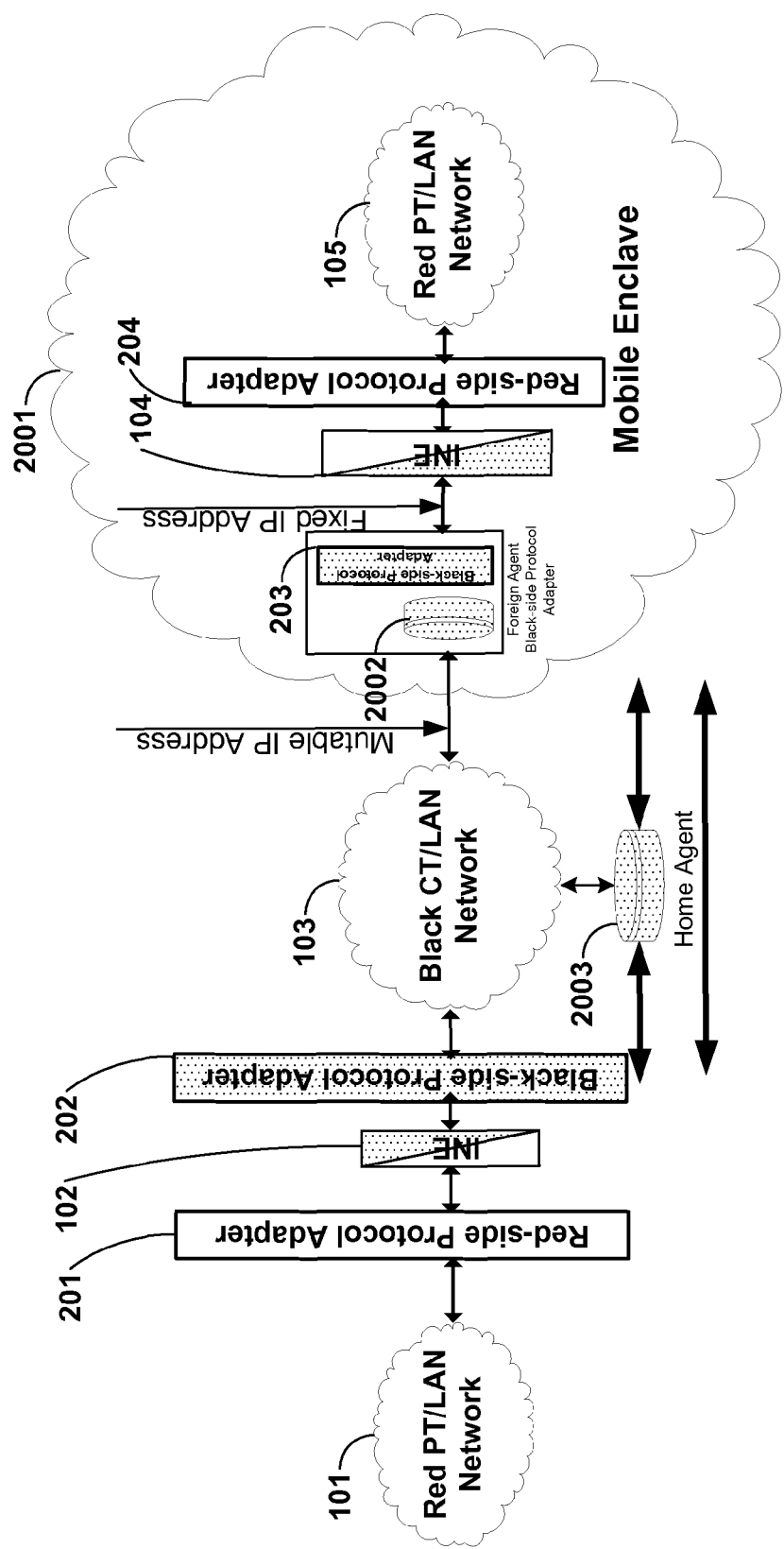
FIG. 14 is a system diagram illustrating a mobile INE-based network with paired protocol adapters configured to implement a mobility management proxy function.

FIG. 14 is a system diagram illustrating a mobile INE-based network with paired protocol adapters configured to implement a mobility management proxy function. The Black-side address of the INE is fixed when the security association is established. If the address later changes due to mobility, then all security associations will need to be re-established leading to connection disruption. The CAPTAIN solution utilizes a pure Black-side proxy with no requirements for Red-to-Black or Black-to-Red signaling. The black-side protocol adapter would incorporate plug-ins to handle various mobility management protocols, such as Mobile IPv4 or Mobile IPv6. For example, in the Mobile IPv4 case the black-side protocol adapter will implement the functions of a Mobile IPv4 "foreign agent". Even though new "care-of" addresses may be assigned by Mobile IP, the black-side protocol adapter will become the router for the INE. This ensures that security associations remain constant even though the Black-side's routed IP address may change.

Since Black-side protocol adapters 202 and 203 manage the destination addresses for all data packets, any movement or mobility of the mobile enclave 2001 can be handled at the Black-side protocol adapter level without wasting traffic by notifying the Red network 105. A Black-side protocol adapter 203 is coupled with a "foreign agent" 2002 to handle the mobility functions necessary. If the destination of mobile enclave 2001 is changed, the encapsulated packets received via the foreign agent 2002 will be routed through the Black-side protocol adapter 203. Alternatively, the destination address of directly received packets could be replaced with the Black-side protocol adapter's permanent home address. The Black network 103 also incorporates home agent 2003 to handle mobility functions on the Black-side, including updating the mutable IP address of the coupled foreign agent 2002 and Black-side protocol adapter 203.

Figure 15:
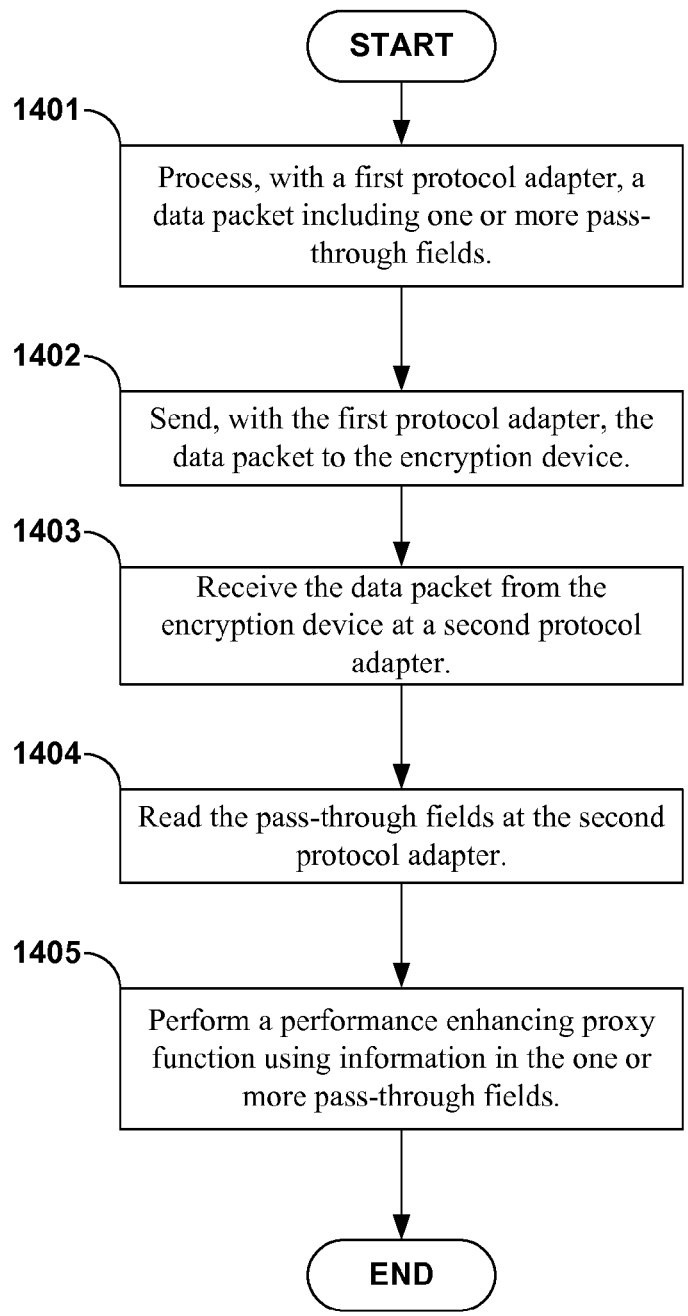
FIG. 15 is a flow diagram illustrating an example method of the disclosure.

FIG. 15 is a flow diagram illustrating an example method of the disclosure. In this process, in step 1401, a first protocol adapter processes a data packet including one or more pass-through fields. This processing step involves intercepting the data packet and inserting information into the one or more pass-through fields. In step 1402, the first protocol adapter sends the data packet to an INE. Step 1403 involves the second protocol adapter receiving the data packet from the INE. In step 1404, the second protocol adapter reads the pass-through fields. This reading step involves extracting the inserted information from the one or more pass-through fields. In step 1405, a performance enhancing proxy function is performed using information in the one or more pass-through fields.

Figure 16:
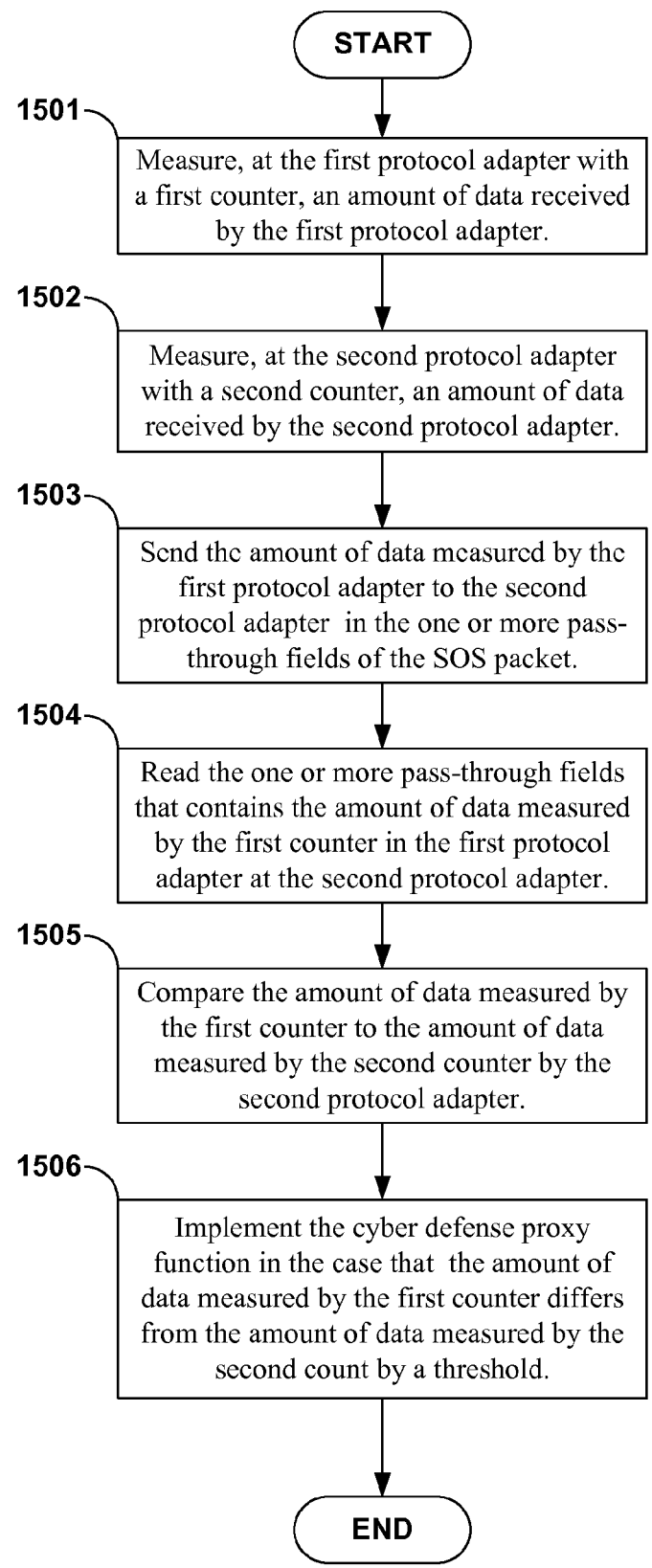
FIG. 16 is a flow diagram illustrating a cyber defense proxy function.

FIG. 16 is a flow diagram illustrating a cyber defense proxy function. In step 1501, the first protocol adapter measures, with a first counter, an amount of data received by the first protocol adapter from the INE. In step 1502, the second protocol adapter measures, with a second counter, an amount of data received by the second protocol adapter. In step 1503, the first protocol adapter sends the amount of data measured by the first protocol adapter to the second protocol adapter in the one or more pass-through fields of the SOS packet. In step 1504, the second protocol adapter reads the one or more pass-through fields that contain the amount of data measured by the first counter in the first protocol adapter. In step 1505, the second protocol adapter compares the amount of data measured by the first counter to the amount of data measured by the second counter. In step 1506, the cyber defense proxy function is implemented in the case that the amount of data measured by the first counter differs from the amount of data measured by the second count by a threshold.

Figure 17:
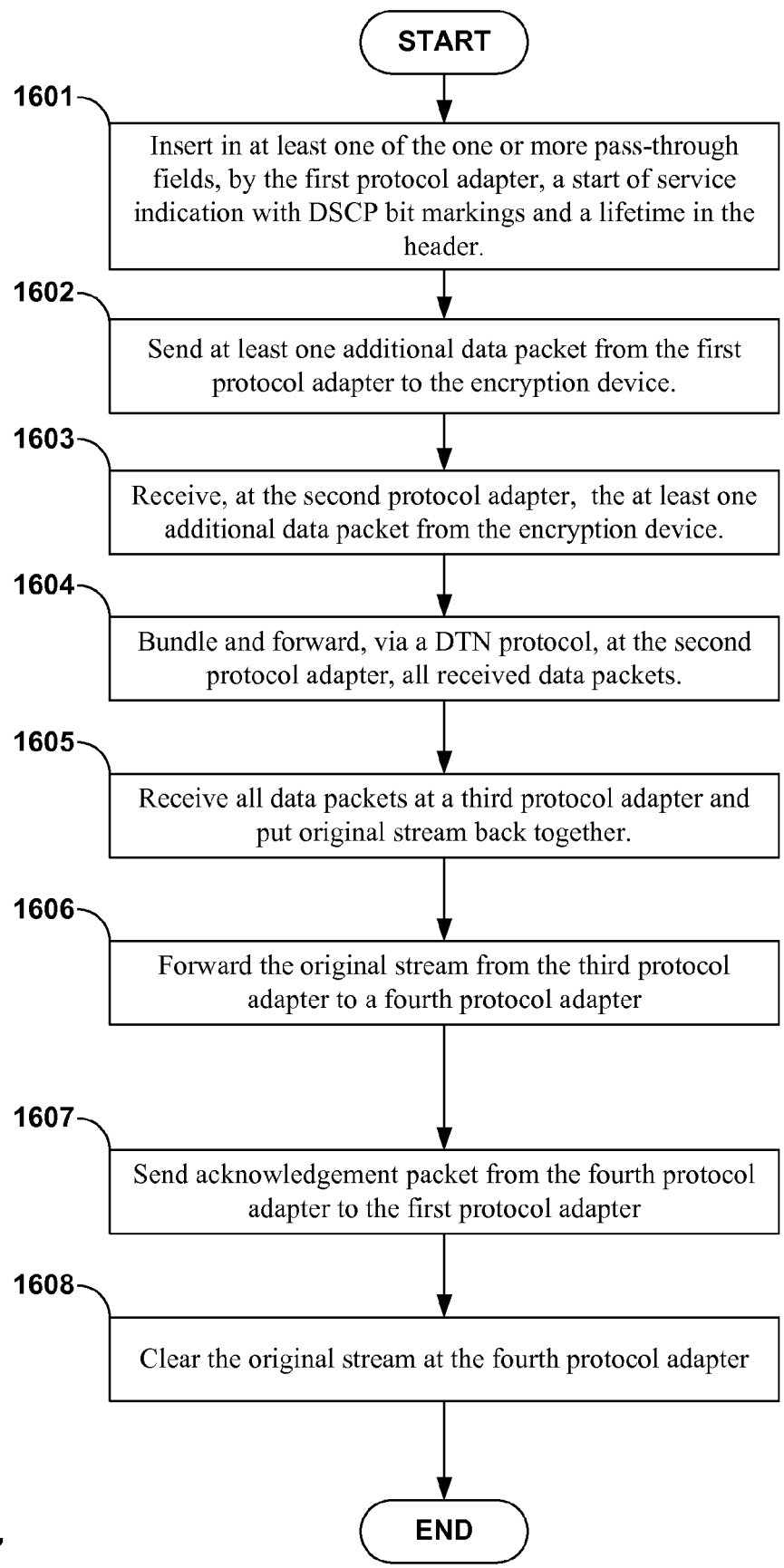
FIG. 17 is a flow diagram illustrating a disruption tolerant network proxy function.

FIG. 17 is a flow diagram illustrating a disruption tolerant network proxy function. In step 1601, the first protocol adapter inserts into at least one of the one or more pass-through fields a start of sequence indication. In step 1602, the first protocol adapter sends at least one additional data packet to the INE. In step 1603, the second protocol adapter receives the at least one additional data packet from the INE. In step 1604, the second protocol adapter bundles each data packet, and forwards using a DTN protocol. In step 1605, a third protocol adapter receives all of the data packets and assembles the original stream back together in order. In step 1606, the third protocol adapter forwards the original stream from the third protocol adapter to a fourth protocol adapter. In step 1607, the fourth protocol adapter sends an acknowledgement packet to the first protocol adapter. In step 1608, the fourth protocol adapter clears the original stream.

Figure 18:
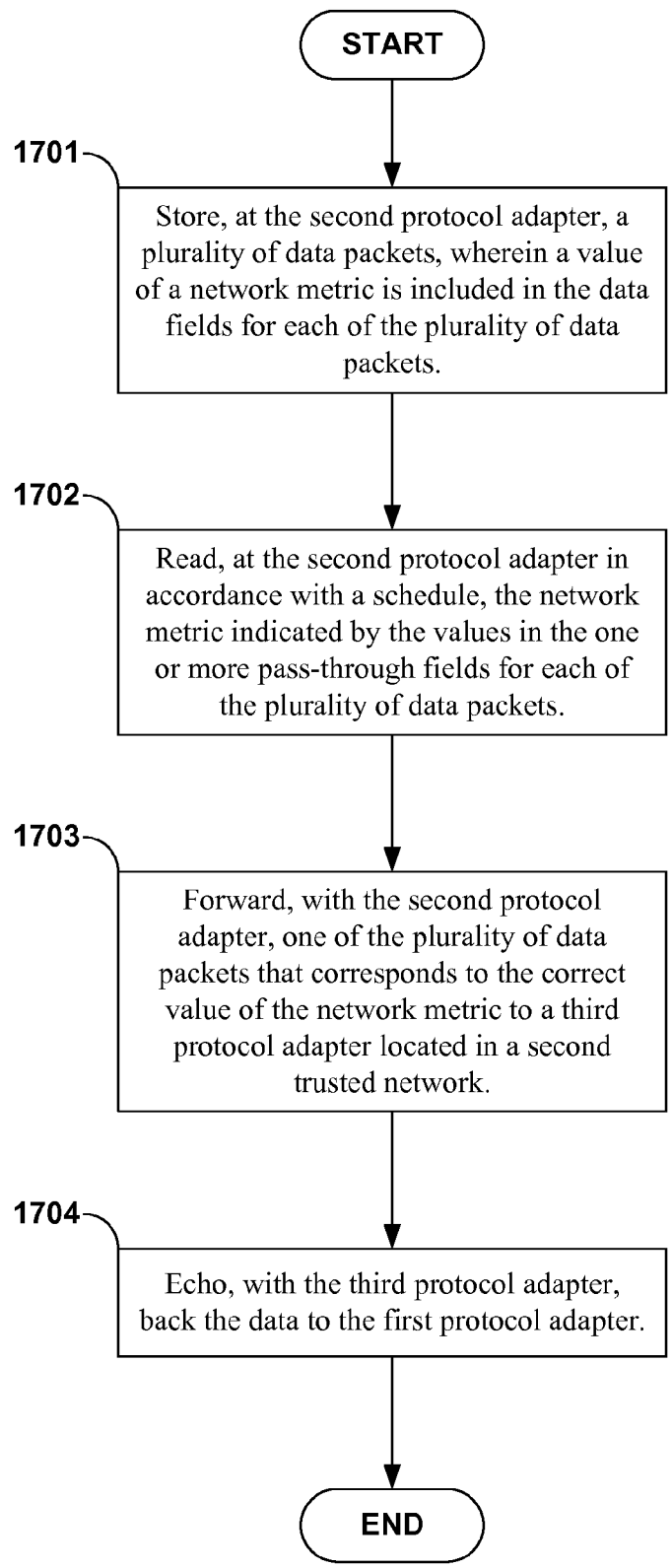
FIG. 18 is a flow diagram illustrating a stored signaling proxy function.

FIG. 18 is a flow diagram illustrating a stored signaling proxy function. In step 1701, after an SOS packet is sent, the second protocol adapter stores a plurality of data packets, wherein a value of a network metric is included in the data for each of the plurality of data packets. In step 1702, the second protocol adapter reads, in accordance with a schedule, the network metric indicated by the values in the one or more pass-through fields for each of the plurality of data packets. In step 1703, the second protocol adapter forwards one of the plurality of data packets that corresponds to the correct value of the network metric to a third protocol adapter located in a second trusted network. In step 1704, the third protocol adapter echoes back the data to the first protocol adapter.

Figure 19:
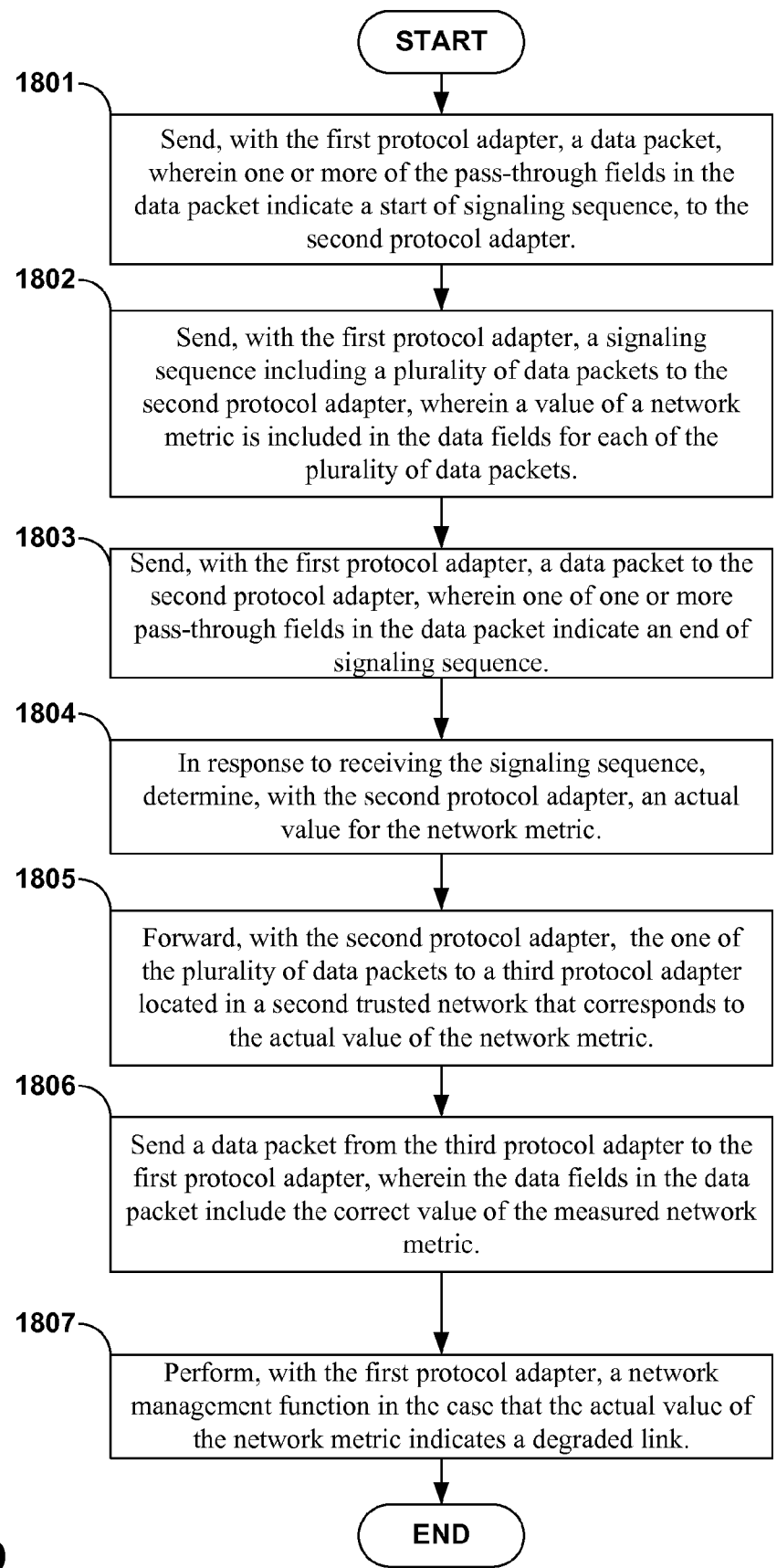
FIG. 19 is a flow diagram illustrating a network sensing proxy function using on-demand signaling.

FIG. 19 is a flow diagram illustrating a network sensing proxy function using on-demand signaling. In step 1801, the first protocol adapter sends a data packet, wherein one or more of the pass-through fields in the data packet indicate a start of sequence indication, to the second protocol adapter. In step 1802, the first protocol adapter sends a data sequence including a plurality of data packets to the second protocol adapter, wherein a value of a network metric is included in the data fields for each of the plurality of data packets. In step 1803, the first protocol adapter sends a data packet, wherein one of one or more pass-through fields in the data packet indicate an end of sequence indication, to the second protocol adapter. In step 1804, the second protocol adapter, in response to receiving the data sequence, determines an actual value for the network metric. In step 1805, the second protocol adapter forwards the one of the plurality of data packets that corresponds to the actual value of the network metric to a third protocol adapter located in a second trusted network. In step 1806, the third protocol adapter echoes back the passed through data packet to the first protocol adapter, wherein the data fields in the data packet include the correct value of the measured network metric. In optional step 1807, the first protocol adapter performs a network management function in the case that the actual value of the network metric indicates a degraded link.

Figure 20:
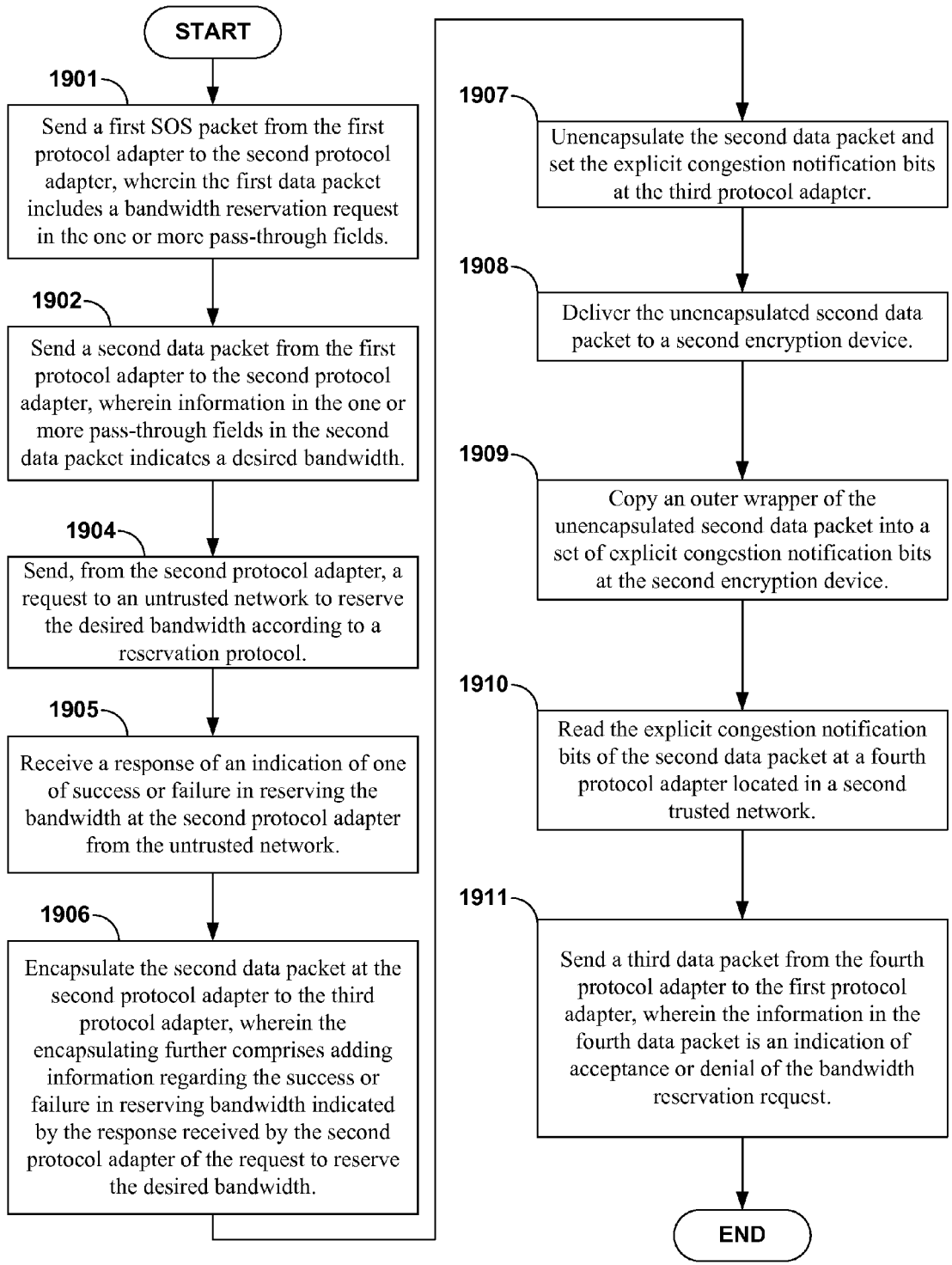
FIG. 20 is a flow diagram illustrating a quality of service proxy function.

FIG. 20 is a flow diagram illustrating a quality of service proxy function. In step 1901, the first protocol adapter sends a first data packet to the second protocol adapter, wherein the first data packet includes a bandwidth reservation request in the one or more pass-through fields. In step 1902, the first protocol adapter sends a second data packet to the second protocol adapter, wherein information in the one or more pass-through fields in the second data packet indicates a desired bandwidth. In step 1904, the second protocol adapter sends a request to an untrusted network to reserve the desired bandwidth according to a reservation protocol. In step 1905, the second protocol adapter receives a response of an indication of one of success or failure in reserving the bandwidth from the untrusted network. In step 1906, the second protocol adapter encapsulates the second data packet to the third protocol adapter, wherein the encapsulating further comprises adding information regarding the success or failure in reserving bandwidth indicated by the response received by the second protocol adapter of the request to reserve the desired bandwidth. In step 1907, the third protocol adapter unencapsulates the second data packet and sets the explicit congestion notification bits in an outer wrapper of the data packet. In step 1908, the third protocol adapter delivers the unencapsulated second data packet to a second INE. In step 1909, the second INE copies an outer wrapper of the unencapsulated second data packet into a set of explicit congestion notification bits at the second INE. In step 1910, a fourth protocol adapter located in a second trusted network reads the explicit congestion notification bits of the data packet. In step 1911, the fourth protocol adapter sends a fourth data packet to the first protocol adapter, wherein the information in the fourth data packet is an indication of acceptance or denial of the bandwidth reservation request.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the disclosure have been described. These and other embodiments are within the scope of the following claims.

What is claimed is:

1. A method comprising:
    processing, with a first protocol adapter positioned within a first network, a data packet to insert a message within a set of one or more pass-through fields of the packet, wherein the first network is separated from a second network by a first encryption device and a second encryption device that securely communicate packets through an intermediate network in encrypted form, wherein the one or more pass-through fields are located in a portion of the data packet that remains unencrypted when the data packet is processed by the first encryption device, and wherein the message comprises sequence information associated with a disruption tolerant networking protocol;
    sending, with the first protocol adapter, the data packet to the first encryption device;
    receiving, with a second protocol adapter positioned within the intermediate network and between the first encryption device and the second encryption device, the data packet in encrypted form;
    reading, with the second protocol adapter, the message from the set of one or more pass-through fields; and
    performing, by the second protocol adapter and responsive to the message, an action, wherein performing the action comprises processing, with the second protocol adapter, a plurality of packets from the first network in accordance with a disruption tolerant networking protocol.

2. The method of claim 1, wherein the first encryption device and the second encryption device are High Assurance Internet Protocol Encryptor (HAIPE®) devices, and wherein the first protocol adapter and the second protocol adapter are performance-enhancing proxy (PEP) adapters.

3. The method of claim 1, wherein the one or more pass-through fields comprise a combination of:
    an explicit congestion notification field;
    a differentiated services code point field;
    a traffic class field; and
    a flow label field.

4. The method of claim 1, further comprising:
    performing a performance enhancing proxy function using the message inserted in the one or more pass-through fields.

5. The method of claim 4, wherein the performance enhancing proxy function is a cyber defense proxy function, the method further comprising:
    measuring with a first counter at the first protocol adapter, an amount of data received by the first protocol adapter;
    measuring with a second counter at the second protocol adapter, an amount of data received by the second protocol adapter;
    sending the amount of data measured by the first protocol adapter to the second protocol adapter in the message in the one or more pass-through fields of the data packet;
    reading the one or more pass-through fields that contains the message indicating the amount of data measured by the first counter in the first protocol adapter at the second protocol adapter;
    comparing the amount of data measured by the first counter to the amount of data measured by the second counter by the second protocol adapter; and
    implementing the cyber defense proxy function in the case that the amount of data measured by the first counter differs from the amount of data measured by the second count by a threshold.

6. The method of claim 4, wherein the performance enhancing proxy function is a disruption tolerant networking (DTN) proxy function, the method further comprising:
    inserting in the message in at least one of the one or more pass-through fields, by the first protocol adapter, a start of sequence indication;
    sending at least one additional data packet from the first protocol adapter to the encryption device in an original stream;
    receiving, at the second protocol adapter, the at least one additional data packet from the encryption device;
    bundling, at the second protocol adapter, all received data packets;
    forwarding, via a DTN protocol, at the second protocol adapter, all received data packets;
    receiving, at a third protocol adapter positioned within the intermediate network, all data packets;
    assembling, at the third protocol adapter, all data packets back to the original stream;
    forward the original stream from the third protocol adapter to a fourth protocol adapter positioned within the second network;
    send an acknowledgement packet from the fourth protocol adapter to the first protocol adapter; and
    clear the original stream at the fourth protocol adapter.

7. The method of claim 4, wherein the performance enhancing proxy function is a stored signaling function, the method further comprising:
    storing, at the second protocol adapter, a plurality of data packets, wherein a value of a network metric is included in the message in the one or more pass-through fields for each of the plurality of data packets;

reading, at the second protocol adapter in accordance with a schedule, the message indicating the network metric indicated by the values in the one or more pass-through fields for each of the plurality of data packets; and forwarding, with the second protocol adapter, one of the plurality of data packets that corresponds to a correct value of the network metric to a third protocol adapter located in the second network.

8. The method of claim 4, wherein the performance enhancing proxy function is a network sensing proxy function, the method further comprising:

sending, with the first protocol adapter to the second protocol adapter, a data packet, wherein a first message in the one or more of the pass-through fields in the data packet indicate a start of sequence indication;

sending, with the first protocol adapter, a data sequence including a plurality of data packets to the second protocol adapter, wherein a value of a network metric is included in data fields for each of the plurality of data packets;

sending, with the first protocol adapter, a data packet, wherein a second message in one of one or more pass-through fields in the data packet indicate an end of sequence indication;

in response to receiving the data sequence, determining, with the second protocol adapter, an actual value for the network metric;

forwarding, with the second protocol adapter, the one of the plurality of data packets to a third protocol adapter positioned in the second network that corresponds to the actual value of the network metric; and sending a data packet from the third protocol adapter to the first protocol adapter, wherein the data fields in the data packet include the correct value of the measured network metric.

9. The method of claim 8, wherein the network sensing proxy function further comprises performing, with the first protocol adapter, a network management function in the case that the actual value of the network metric indicates a degraded link.

10. The method of claim 4, wherein the performance enhancing proxy function is a quality-of-service management proxy function, the method further comprising:

sending a first data packet from the first protocol adapter to the second protocol adapter, wherein the first data packet includes a bandwidth reservation request with a desired bandwidth as a first message in the one or more pass-through fields;

sending a second data packet from the first protocol adapter to the second protocol adapter, wherein a second message in the one or more pass-through fields in the second data packet indicates a desired destination;

sending a third data packet from the first protocol adapter to the second protocol adapter, wherein a third message in the one or more pass-through fields in the third data packet indicates an end-of-signal packet;

sending, from the second protocol adapter, a request to the intermediate network to reserve the desired bandwidth according to a reservation protocol;

receiving a response of an indication of one of success or failure in reserving the bandwidth at the second protocol adapter from the intermediate network;

encapsulating the second data packet at the second protocol adapter to a third protocol adapter positioned within the intermediate network, wherein the encapsulating further comprises adding information regarding the success or failure in reserving bandwidth indicated by the response received by the second protocol adapter of the request to reserve the desired bandwidth;

unencapsulating the second data packet at the third protocol adapter;

setting a set of explicit congestion notification bits in an outer wrapper of the unencapsulated fourth data packet;

delivering the unencapsulated fourth data packet to a second encryption device;

copying the outer wrapper of the unencapsulated second data packet into a set of explicit congestion notification bits at the second encryption device;

reading the explicit congestion notification bits of the second data packet at a fourth protocol adapter located in the second network; and sending a fourth data packet from the fourth protocol adapter to the first protocol adapter, wherein the information in the fourth data packet is an indication of acceptance or denial of the bandwidth reservation request.

11. The method of claim 4, wherein the performance enhancing proxy function is a multicast traffic management proxy function, wherein the first network comprises one or more sources, and wherein the intermediate network comprises a first router and a second router, further comprising:

sending a flow from one of the one or more sources to the second network, wherein the second network comprises one or more receivers;

monitoring, at a third protocol adapter located in the second network, which of the one or more receivers is subscribing to the flow;

unsubscribing, by one of the one or more receivers, from the flow; and if there are no remaining receivers subscribing to the flow, further:

sending a data packet from the third protocol adapter to a fourth protocol adapter located in the intermediate network, wherein the fourth protocol adapter is associated with the third protocol adapter, and wherein the data packet has been processed such that the message in one or more pass-through fields in the data packet indicates a leave operation and a source address of the flow;

sending a leave operation notification from the fourth protocol adapter to the second router using a multicast protocol, wherein the leave operation notification comprises an indication of a leave operation and a source address of the flow;

sending the leave operation notification from the second router to the first router using the multicast protocol;

sending the leave operation notification from the first router to the second protocol adapter; and blocking, at the second protocol adapter, all data packets received that contain a source address that is the same as the source address contained in the leave operation notification.

12. A system comprising:

a first protocol adapter positioned within a first network, wherein the first protocol adapter is configured to:

process a data packet to insert a message within a set of one or more pass-through fields of the packet, wherein the first network is separated from a second network by a first encryption device and a second encryption device that securely communicate packets through an intermediate network in encrypted form, wherein the one or more pass-through fields are located in a portion of the data packet that remains unencrypted when the data packet is processed by the first encryption device, and wherein the message comprises sequence information associated with a disruption tolerant networking protocol; and send the data packet to the first encryption device; and a second protocol adapter positioned within the intermediate network and between the first encryption device and the second encryption device, wherein the second protocol adapter is configured to:

receive the data packet in encrypted form;

read the message from the set of one or more pass-through fields; and perform, responsive to the message, an action, wherein performing the action comprises processing, with the second protocol adapter, a plurality of packets from the first network in accordance with a disruption tolerant networking protocol.

13. The system of claim 12, wherein the data packet is one of an IPv4 packet and an IPv6 packet, and wherein the one or more pass-through fields comprise a combination of:

an explicit congestion notification field;
a differentiated services code point field;
a traffic class field; and
a flow label field.

14. The system of claim 12, wherein the first encryption device and the second encryption device are High Assurance Internet Protocol Encryptor (HAIPE®) devices, and wherein the first protocol adapter and the second protocol adapter are performance-enhancing proxy (PEP) adapters.

15. The system of claim 12, wherein one or more of the first protocol adapter and the second protocol adapter are configured to perform a performance enhancing proxy function using the message inserted in the one or more pass-through fields.

16. The system of claim 15, wherein the performance enhancing proxy function is one or more of a cyber defense proxy function, a disruption tolerant networking (DTN) proxy function, a stored signaling function, a network sensing proxy function, a quality-of-service management proxy function, and a multicast traffic management proxy function.

17. A computer-readable storage medium storing instructions that, when executed, cause one or more processors to:

process, with a first protocol adapter positioned within a first network, a data packet to insert a message within a set of one or more pass-through fields of the packet, wherein the first network is separated from a second network by a first encryption device and a second encryption device that securely communicate packets through an intermediate network in encrypted form, wherein the one or more pass-through fields are located in a portion of the data packet that remains unencrypted when the data packet is processed by the first an encryption device, and wherein the message comprises sequence information associated with a disruption tolerant networking protocol;

send, with the first protocol adapter, the data packet to the first encryption device; and perform a performance enhancing proxy function using the message inserted in the one or more pass-through fields, wherein performing the performance enhancing proxy function comprises processing, with the second protocol adapter, a plurality of packets from the first network in accordance with a disruption tolerant networking protocol.

18. The method of claim 1, further comprising forwarding, with the second protocol adapter, the packet in encrypted form to the second encryption device for decryption and delivery to the second network.

19. The method of claim 1, wherein performing an action further comprises dropping, with the second protocol adapter and responsive to the message, the packet without forwarding the packet to the second encryption device for decryption and delivery to the second network.

20. The method of claim 1, wherein the message further comprises data indicative of an amount of network traffic received by the first protocol adapter within the first network; and wherein performing the action further comprises detecting, with the second protocol adapter positioned within the intermediate network and responsive to the message, an occurrence of a network attack.

21. The method of claim 1, wherein the message further comprises a value of a network metric; and wherein performing the action further comprises forwarding the data packet to the second network when the value of the network metric is equal to a value of a property of the first network.

22. The method of claim 1, wherein the message further comprises data indicative of a bandwidth reservation request with a desired bandwidth; and wherein performing the action further comprises at least one of accepting or denying the bandwidth reservation request.

23. The method of claim 1, wherein the message further comprises data indicative of an operation used in multicast traffic management; and wherein performing the action further comprises at least one of subscribing or unsubscribing to a multicast flow based on the message.

24. The method of claim 1, wherein the message conforms to a messaging protocol implemented by the first protocol adapter and the second protocol adapter; and wherein performing an action further comprises processing the message with the second protocol adapter in accordance with the messaging protocol and, responsive to the processing, performing the action.

25. A protocol adapter device positioned within a first network, the protocol adapter comprising:

two or more interfaces, wherein at least a first interface is configured to communicate with a network and at least a second interface is configured to communicate with a first encryption device; and one or more processors configured to:

process a data packet to insert a message within a set of one or more pass-through fields of the packet, wherein the first network is separated from a second network by a first encryption device and a second encryption device that securely communicate packets through an intermediate network in encrypted form, wherein the one or more pass-through fields are located in a portion of the data packet that remains unencrypted when the data packet is processed by the first encryption device, and wherein the message comprises sequence information associated with a disruption tolerant networking protocol;

send the data packet to the first encryption device; and perform a performance enhancing proxy function using the message inserted in the one or more pass-through fields, wherein performing the performance enhancing proxy function comprises processing, with the second protocol adapter, a plurality of packets from the first network in accordance with a disruption tolerant networking protocol.

26. A method comprising:

measuring with a first counter at a first protocol adapter, the first protocol adapter positioned within a first network, an amount of data received by the first protocol adapter;

measuring with a second counter at a second protocol adapter, the second protocol adapter positioned within an intermediate network between a first encryption device and a second encryption device, an amount of data received by the second protocol adapter, wherein the first network is separated from a second network by the first encryption device and the second encryption device that securely communicate packets through the intermediate network in encrypted form;

processing, with the first protocol adapter, a data packet to insert a message within a set of one or more pass-through fields of the data packet, wherein the one or more pass-through fields are located in a portion of the data packet that remains unencrypted when the data packet is processed by the first encryption device, and wherein the message comprises the amount of data measured by the first protocol adapter;

sending, with the first protocol adapter, the data packet to the first encryption device;

receiving, with the second protocol adapter, the data packet in encrypted form; and reading the one or more pass-through fields that contains the message indicating the amount of data measured by the first counter in the first protocol adapter at the second protocol adapter;

performing, by the second protocol adapter and responsive to the message, an action, wherein performing the action comprises:
  comparing the amount of data measured by the first counter to the amount of data measured by the second counter by the second protocol adapter; and
  implementing a cyber defense proxy function in the case that the amount of data measured by the first counter differs from the amount of data measured by the second count by a threshold.

27. A method comprising:

processing, with a first protocol adapter positioned within a first network, a data packet to insert a message within a set of one or more pass-through fields of the packet, wherein the first network is separated from a second network by a first encryption device and a second encryption device that securely communicate packets through an intermediate network in encrypted form, wherein the one or more pass-through fields are located in a portion of the data packet that remains unencrypted when the data packet is processed by the first encryption device, and wherein the message comprises a start of sequence indication;

sending, with the first protocol adapter, the data packet to the first encryption device;

receiving, with a second protocol adapter positioned within the intermediate network and between the first encryption device and the second encryption device, the data packet in encrypted form;

reading, with the second protocol adapter, the message from the set of one or more pass-through fields;

sending at least one additional data packet from the first protocol adapter to the encryption device in an original stream;

receiving, at the second protocol adapter, the at least one additional data packet from the encryption device;

bundling, at the second protocol adapter, all received data packets;

forwarding, via a disruption tolerant networking protocol, at the second protocol adapter, all received data packets;

receiving, at a third protocol adapter positioned within the intermediate network, all data packets;

assembling, at the third protocol adapter, all data packets back to the original stream;

forward the original stream from the third protocol adapter to a fourth protocol adapter positioned within the second network;

send an acknowledgement packet from the fourth protocol adapter to the first protocol adapter; and clear the original stream at the fourth protocol adapter.

28. A method comprising:

processing, with a first protocol adapter positioned within a first network, a first data packet to insert a message within a set of one or more pass-through fields of the first data packet, wherein the first network is separated from a second network by a first encryption device and a second encryption device that securely communicate packets through an intermediate network in encrypted form, wherein the one or more pass-through fields are located in a portion of the first data packet that remains unencrypted when the data packet is processed by the first encryption device, and wherein the message in the first data packet includes a value of a network metric;

sending, with the first protocol adapter, the first data packet to the first encryption device;

receiving, with a second protocol adapter positioned within the intermediate network and between the first encryption device and the second encryption device, the first data packet in encrypted form;

storing, at the second protocol adapter, a plurality of data packets, wherein a distinct value of the network metric is included as the message in the one or more pass-through fields for each of the plurality of data packets;

reading, with the second protocol adapter, the message indicating the value of the network metric from the set of one or more pass-through fields for the first data packet; and forwarding, with the second protocol adapter, one of the plurality of data packets that corresponds to the correct value of the network metric to a third protocol adapter located in the second network.

29. A method comprising:

processing, with a first protocol adapter positioned within a first network, a first data packet to insert a first message within a set of one or more pass-through fields of the packet, wherein the first network is separated from a second network by a first encryption device and a second encryption device that securely communicate packets through an intermediate network in encrypted form, wherein the one or more pass-through fields are located in a portion of the first data packet that remains unencrypted when the first data packet is processed by the first encryption device, and wherein the message comprises a start of sequence indication;

sending, with the first protocol adapter, the first data packet to the first encryption device;

receiving, with a second protocol adapter positioned within the intermediate network and between the first encryption device and the second encryption device, the first data packet in encrypted form;

reading, with the second protocol adapter, the message from the set of one or more pass-through fields;

sending, with the first protocol adapter, a data sequence including a plurality of data packets to the second protocol adapter via the first encryption device, wherein a value of a network metric is included in data fields for each of the plurality of data packets;

sending, with the first protocol adapter, a second data packet, wherein a second message in one of one or more pass-through fields in the second data packet indicates an end of sequence indication;

in response to receiving the data sequence, determining, with the second protocol adapter, an actual value for the network metric;

forwarding, with the second protocol adapter, the one of the plurality of data packets to a third protocol adapter positioned in the second network that corresponds to the actual value of the network metric; and sending a data packet from the third protocol adapter to the first protocol adapter, wherein the data fields in the data packet include a correct value of the measured network metric.

30. The method of claim 29, further comprising:

performing, with the first protocol adapter, a network management function in the case that the actual value of the network metric indicates a degraded link.

31. A method comprising:

processing, with a first protocol adapter positioned within a first network, a first data packet to insert a first message within a set of one or more pass-through fields of the packet, wherein the first network is separated from a second network by a first encryption device and a second encryption device that securely communicate packets through an intermediate network in encrypted form, wherein the one or more pass-through fields are located in a portion of the first data packet that remains unencrypted when the first data packet is processed by the first encryption device, and wherein the first message comprises a bandwidth reservation request with a desired bandwidth;

sending, with the first protocol adapter, the first data packet to the first encryption device;

receiving, with a second protocol adapter positioned within the intermediate network and between the first encryption device and the second encryption device, the first data packet in encrypted form;

reading, with the second protocol adapter, the message from the set of one or more pass-through fields;

sending a second data packet from the first protocol adapter to the second protocol adapter, wherein a second message in the one or more pass-through fields in the second data packet indicates a desired destination;

sending a third data packet from the first protocol adapter to the second protocol adapter, wherein a third message in the one or more pass-through fields in the third data packet indicates an end-of-signal packet;

sending, from the second protocol adapter, a request to the intermediate network to reserve the desired bandwidth according to a reservation protocol;

receiving a response of an indication of one of success or failure in reserving the bandwidth at the second protocol adapter from the intermediate network;

encapsulating the second data packet at the second protocol adapter to a third protocol adapter positioned within the intermediate network, wherein the encapsulating further comprises adding information regarding the success or failure in reserving bandwidth indicated by the response received by the second protocol adapter of the request to reserve the desired bandwidth;

unencapsulating the second data packet at the third protocol adapter;

setting a set of explicit congestion notification bits in an outer wrapper of the unencapsulated fourth data packet;

delivering the unencapsulated fourth data packet to a second encryption device;

copying the outer wrapper of the unencapsulated second data packet into a set of explicit congestion notification bits at the second encryption device;

reading the explicit congestion notification bits of the second data packet at a fourth protocol adapter located in the second network; and sending a fourth data packet from the fourth protocol adapter to the first protocol adapter, wherein the information in the fourth data packet is an indication of acceptance or denial of the bandwidth reservation request.

32. A method comprising:

processing, with a first protocol adapter positioned within a first network, a first data packet to insert a first message within a set of one or more pass-through fields of the packet, wherein the first network is separated from a second network by a first encryption device and a second encryption device that securely communicate packets through an intermediate network in encrypted form, wherein the first network comprises one or more sources, wherein the intermediate network comprises a first router and a second router, wherein the one or more pass-through fields are located in a portion of the first data packet that remains unencrypted when the first data packet is processed by the first encryption device;

sending, with the first protocol adapter, the first data packet to the first encryption device;

receiving, with a second protocol adapter positioned within the intermediate network and between the first encryption device and the second encryption device, the first data packet in encrypted form;

reading, with the second protocol adapter, the message from the set of one or more pass-through fields;

sending a flow from one of the one or more sources to the second network, wherein the second network comprises one or more receivers;

monitoring, at a third protocol adapter located in the second network, which of the one or more receivers is subscribing to the flow;

unsubscribing, by one of the one or more receivers, from the flow; and if there are no remaining receivers subscribing to the flow, the method further comprising:

sending a data packet from the third protocol adapter to a fourth protocol adapter located in the intermediate network, wherein the fourth protocol adapter is associated with the third protocol adapter, and wherein the data packet has been processed such that the message in one or more pass-through fields in the data packet indicates a leave operation and a source address of the flow;

sending a leave operation notification from the fourth protocol adapter to the second router using a multicast protocol, wherein the leave operation notification comprises an indication of a leave operation and a source address of the flow;

sending the leave operation notification from the second router to the first router using the multicast protocol;

sending the leave operation notification from the first router to the second protocol adapter; and blocking, at the second protocol adapter, all data packets received that contain a source address that is the same as the source address contained in the leave operation notification.

* * * * *